SIGNAL-OPERATED VARIABLE-GAIN AMPLIFYING SYSTEM

Filed March 8, 1946 5 Sheets-Sheet 1

INVENTOR
Leon H. Appleman
By Mueller + Mason
Attorneys

Jan. 20, 1953 L. H. APPLEMAN 2,626,322

SIGNAL-OPERATED VARIABLE-GAIN AMPLIFYING SYSTEM

Filed March 8, 1946 5 Sheets-Sheet 2

INVENTOR.
Leon H. Appleman
BY Mueller + Mason
ATTORNEYS

SIGNAL-OPERATED VARIABLE-GAIN AMPLIFYING SYSTEM

Filed March 8, 1946 5 Sheets-Sheet 3

INVENTOR.
Leon H. Appleman
BY Mueller + Mason
ATTORNEYS.

Jan. 20, 1953 L. H. APPLEMAN 2,626,322

SIGNAL-OPERATED VARIABLE-GAIN AMPLIFYING SYSTEM

Filed March 8, 1946 5 Sheets-Sheet 4

INVENTOR
Leon H. Appleman
Mueller & Mason
Attorneys

Jan. 20, 1953 L. H. APPLEMAN 2,626,322

SIGNAL-OPERATED VARIABLE-GAIN AMPLIFYING SYSTEM

Filed March 8, 1946 5 Sheets-Sheet 5

INVENTOR.
Leon H. Appleman
BY Mueller & Mason
Attorneys

Patented Jan. 20, 1953

2,626,322

UNITED STATES PATENT OFFICE 2,626,322

SIGNAL-OPERATED VARIABLE-GAIN AMPLIFYING SYSTEM

Leon H. Appleman, Waco, Tex., assignor to Mason, Kolehmainen, Rathburn & Wyss, Chicago, Ill., a partnership Application March 8, 1946, Serial No. 652,913

46 Claims. (Cl. 179—171)

Figure 1:
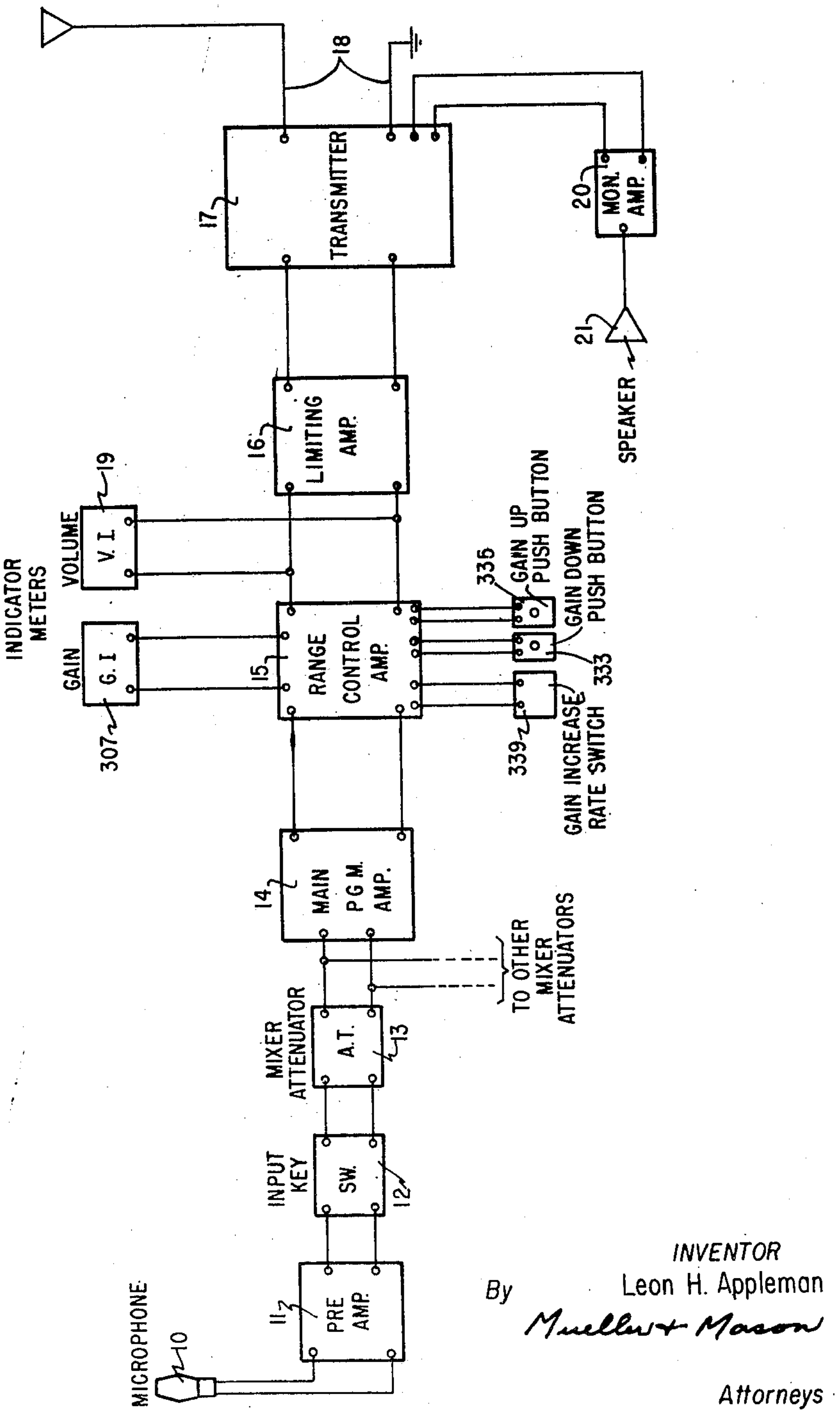

The present invention relates to gain control systems and more particularly to an improved signal-operated variable-gain vacuum tube amplifying system specifically adapted to effect fully automatic control of the volume level in the audio channel of a radio broadcast transmitting system.

Audio gain control has long been recognized as essential in radio broadcasting, the purpose being to hold the audio signal input level to the transmitter at as high a value as possible without permitting it to rise to a value at which over modulation of the carrier occurs. Although various proposals are mentioned in the patent literature for controlling the gain of the audio signal channel of a radio broadcasting system on an automatic basis, such proposals have not been generally adapted in commercial practice, possibly for the reason that the type of automatic gain control provided is not sufficiently flexible to meet all of the requirements in handling programs of different types. Regardless of the cause, most commercial broadcasting systems still rely upon manual gain control by an operator to determine the signal output level from the audio channel of the system to the transmitter. In general, the operator in handling a speech program, such, for example, as a newscast, is not concerned with the dynamic pattern of the signal, but tries to keep the audio output level to the transmitter as high as possible without consistently over modulating the transmitter. In other words, low level passages in speech programs are not desired, which means that the audio channel gain should be constantly and rapidly changed to compensate for signal input level changes. In handling music programs maximum signal output level consistent with undistorted transmission is retained as an objective subject to the limitation that the gain changes should not be so effected as to distort the dynamic pattern of the music. Stated otherwise, the gain control action should be so governed as to preserve the contrast between high and low level passages in the signal input pattern. These ends are fairly easy to achieve when manual gain control is relied upon, but to a degree at least are inconsistent with each other when automatic gain control is attempted. The problem of successfully providing automatic gain control is further complicated by the fact that in most musical programs, music numbers and speech in the form of announcements, advertisements and the like, are frequently interspersed and closely follow each other, which means that different and non-conflicting controls must be automatically imposed upon the gain control circuits to meet the different requirements of the speech and music transmission.

It is an object of the present invention, therefore, to provide an improved variable-gain audio frequency amplifying system, the gain (i. e., amplification) of which is automatically self-regulated, in response to the system's signal output level, in such manner that the signal output level is kept between predetermined upper and lower limits irrespective of wide excursions of the signal input level.

It is another object of the invention to provide for controlling the signal transmission level through an audio signal transmission channel, an improved gain control system which operates on a fully automatic basis and meets all of the operating requirements outlined above, regardless of the type or pattern of the signal input thereto.

According to a further object of the invention, improved automatic gain increase control facilities are provided in the gain control system for supplying the requisite fast gain increase control in the handling of speech signals and for preventing unwanted gain increases in the handling of low level passages in musical programs.

In accordance with another object of the invention, improved facilities are provided in the gain control system for insuring a limited gain increase of limited duration in the associated signal channel at the start of each period of signal transmission through the channel.

It is a further object of the invention to provide improved facilities in the gain control system for effecting signal peak suppression and gain decreases in the associated signal channel on a fully automatic and signal responsive basis.

In accordance with still another object of the invention, gain decreases are effected at an audio frequency rate and improved facilities are provided in the signal channel for preventing the fast gain changes thus produced from producing unwanted noise at the output side of the signal channel.

According to a still further object of the invention, the gain decreasing facilities are arranged in an improved manner to permit limited gain recovery following each period of peak suppression, the extent of which varies as an inverse function of the signal peak persistence.

Figure 2A:
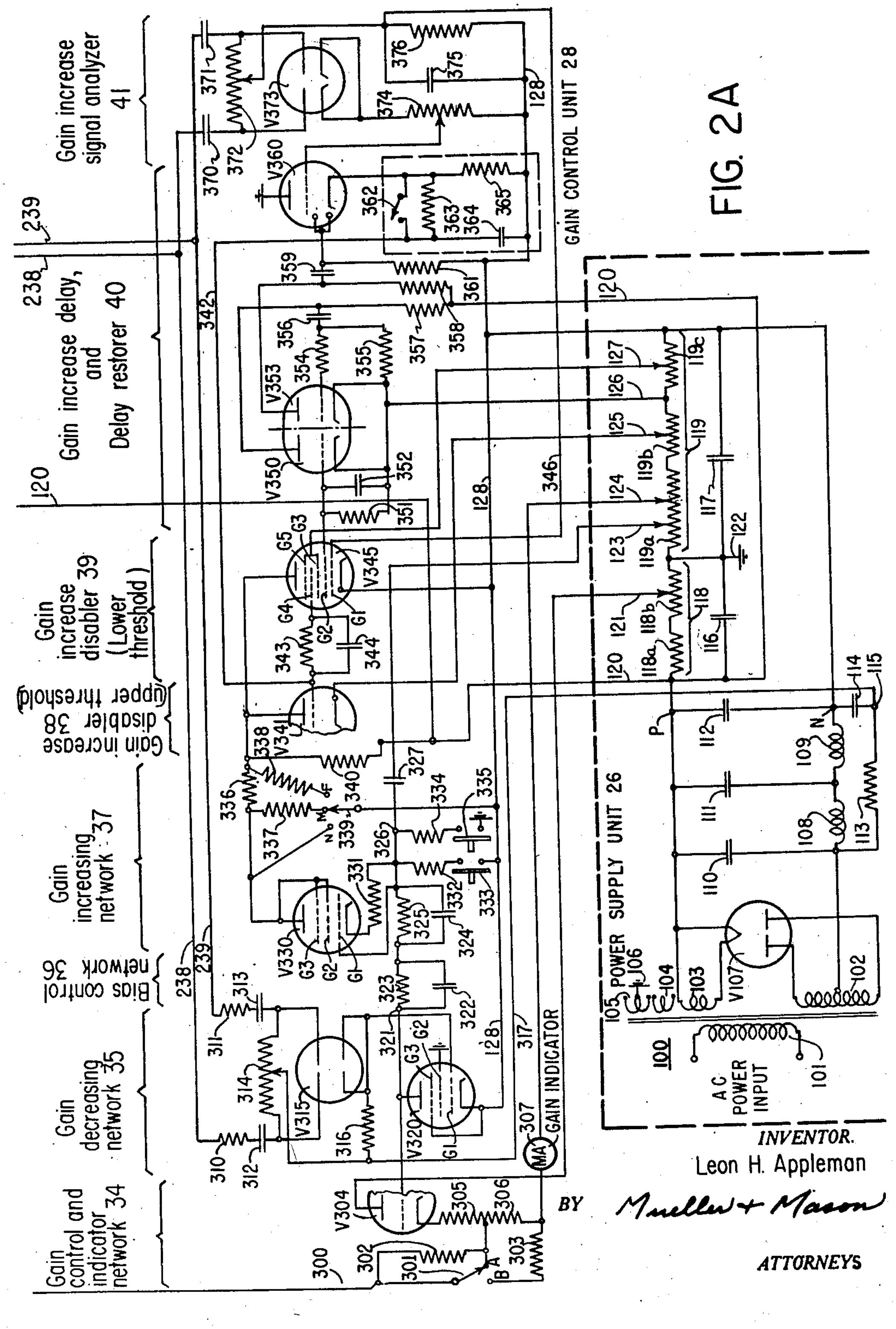
Figure 2B:
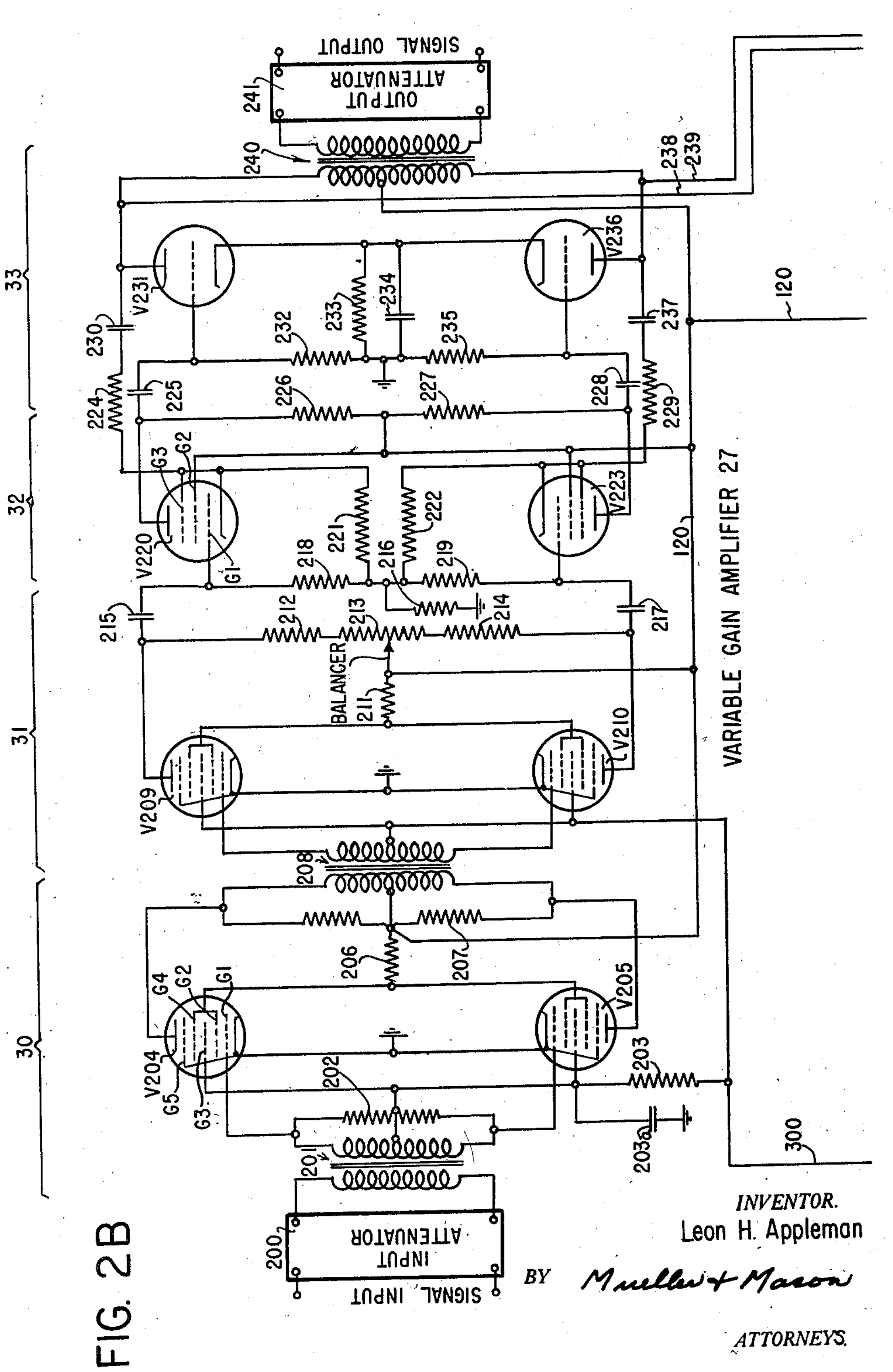
Figure 3:
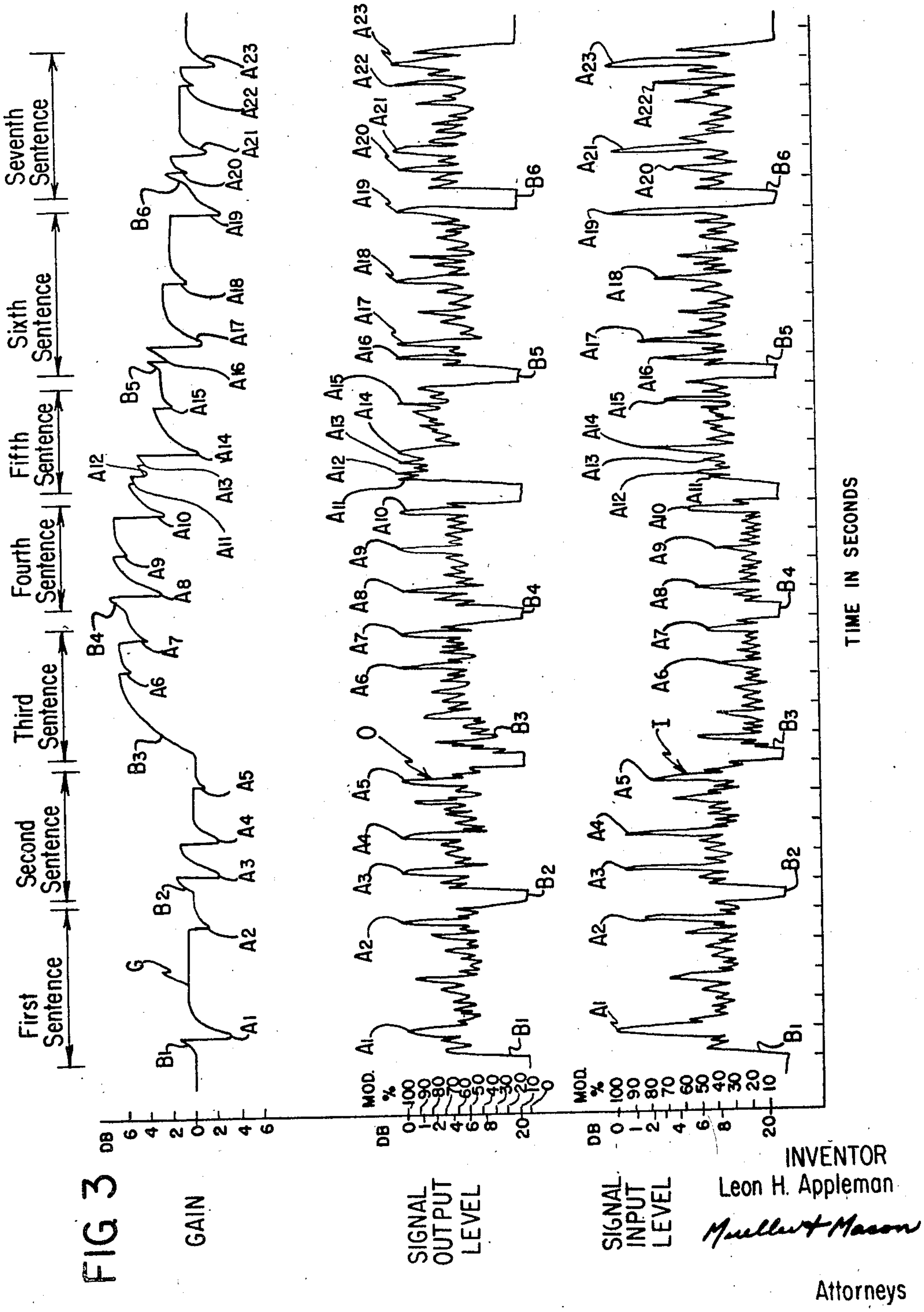
Figure 4:
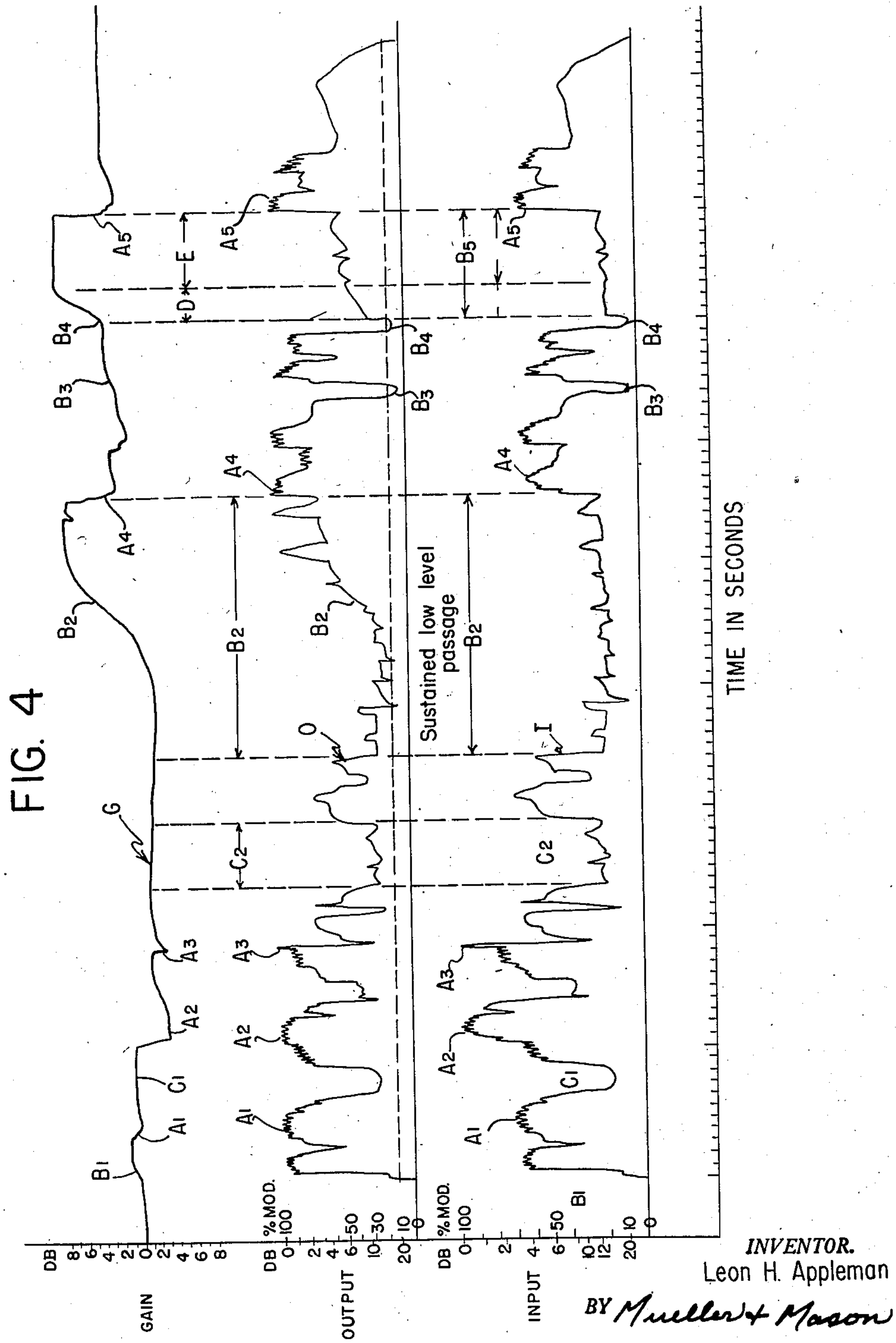

The invention, both as to its organization and method of operation, together with further objects and advantages thereof, will best be understood by reference to the following specification taken in connection with the accompanying drawings, in which:

Fig. 1 illustrates a typical signal transmission channel of a broadcast transmitter in which the amplifying system may be employed;

Figs. 2B and 2A when laid one above the other in the order named schematically illustrate one specific embodiment of the present improved system; and Figs. 3 and 4 are graphs illustrating the manner in which the system operates during transmission of signals of different types having different signal patterns.

Referring now to the drawings and more particularly to Fig. 1 thereof, there is illustrated an audio frequency signal channel in the form of a typical radio broadcast transmitter program channel, which comprises a microphone 10, a signal preamplifier 11, a signal switching key 12, a mixer attenuator 13, a main program amplifier 14, a variable gain amplifying system 15, a limiting amplifier 16, a transmitter 17 and an antenna-ground circuit 18 connected in tandem in the order named. In this channel, program signals picked up by the microphone 10 are amplified, possibly as much as 40 decibels (hereinafter abbreviated db), by the preamplifier 11, fed through the input key 12 (an on-off switch) to the mixer attenuator 13, where the program level may be manually attenuated as conditions demand, and then fed to the main program amplifier 14 for as much as 60 db additional amplification. Other mixer attenuators from other signal sources such as microphones and phonograph pick-ups are likewise connected to the main program amplifier input circuit. Omitting from consideration for the moment the present improved variable-gain amplifying system 15, the output from the main program amplifier 14 is fed through this system and the limiting amplifier 16 to the transmitter 17, where the signal is modulated on a carrier of determined center frequency and fed to the antenna-ground circuit 18 for radiation. In the described channel, the limiting amplifier 16 performs two functions, viz., it limits audio signal peaks to a predetermined maximum amplitude to prevent overmodulation of the transmitter, and it raises the average program signal level by as much as 5 db. Signal volume indication is provided by an indicator 19 which at all times indicates the level of the program signal entering the limiting amplifier. Monitoring facilities comprising a monitor amplifier 20 and a loud speaker 21 are provided to permit sampling of the transmitter output for monitor and control purposes.

As thus far described the system generally is conventional. In the usual system of this character an operator is required continuously to monitor the volume indicator 19, manually adjust the mixer attenuator 13 as required to raise the average signal level when it tends to fall below good audibility, and to lower the average signal level when it tends to rise beyond a point at which the limiting amplifier 16 causes overcompression. Normally, the operator attempts manually to maintain the highest average level consistent with 5 db maximum reduction of peaks by the limiting amplifier 16. This requires constant vigilance on the part of the operator, and it is only human that he will seldom perform his control function perfectly, and often will perform more or less poorly. The operator's control work is the more difficult, and his average performance the less acceptable, in the absence of the limiting amplifier 16, since in such case he must also anticipate and reduce signal peaks which tend to exceed the maximum allowable level corresponding to 100% transmitter modulation.

In accordance with the present invention, the improved and fully automatic variable-gain amplifying system 15 relieves the operator of his signal level control duties, and assumes the level control responsibility upon an entirely flexible and consistently reliable basis. In general, this system automatically varies its gain in response to the varying level of the signal passing through it, so that the output signal level is maintained between predetermined limits. Gain is rapidly reduced when the signal level tends to exceed a predetermined maximum, in order that the output will not exceed the capabilities of the succeeding transmitting equipment, since as noted above, too strong an audio signal from the studio can have the effect of disabling a radio broadcast transmitter. Gain is increased if the signal level falls below a predetermined lower limit, in order to maintain the output at a sufficiently high level to operate the succeeding transmitter equipment satisfactorily, since too low a signal from the studio can cause a radio broadcast to be inaudible above atmospheric noise. When operating in response to signals having smoothly varying level characteristics, typical of many types of music, the present improved system 15 affords delayed gain increase which protects the normally brief low volume spots in such musical programs. On the other hand, when operating upon the rapidly and sharply varying signals characteristic of speech, the present system affords substantially instantaneous gain increase control.

Referring now more particularly to Figs. 2A and 2B of the drawings, the circuit arrangement of a specific illustrative embodiment of the present improved amplifying system 15 is there illustrated. Briefly, the system comprises three distinct sections, i. e. a power supply unit 26, the circuit components of which are identified by reference numerals in the hundreds series beginning with 100, a variable-gain amplifier 27, the circuit components of which are identified by reference numerals in the hundreds series beginning with 200, and a gain control unit 28, the circuit components of which are identified by reference numerals in the hundreds series beginning with 300. It is noted further that the gain indicator 337, the gain increase rate switch 339, and the gain up and gain down push-button switches 333 and 335, all incorporated in the gain control unit 28, are preferably located at the operator's program control panel, or elsewhere remote from the amplifying system itself.

*Power supply unit 26*

This unit furnishes the necessary electrical power to both the gain control unit 28 and the variable-gain amplifier 27, and as shown, is a conventional vacuum tube type of rectifier-filter system. Briefly, it includes a multi-winding transformer 100, which is provided with a primary winding 101 connected to an alternating current power source (not shown), and secondary windings 102, 103, 104, and 105. The secondary winding 102 is a high-voltage winding having end terminals which connect to the anodes of a full wave rectifier tube V107, and a center tap which forms the negative terminal of the rectifier and connects to one sde of the filter network. The low voltage secondary winding 103 supplies heating current to the filament of the rectifier tube V107, forms the positive terminal of the rectifier, and is connected to the positive side of the filter network. Secondary windings 104 and 105 are used to supply cathode heater power to the vacuum tubes of the gain control unit 28 and the variable-gain amplifier 27. The secondary winding 105 is shown with its mid-point grounded at 106; but the winding 104 is ungrounded, since the tube V330 included in the gain control unit 28 and receiving cathode heater current from this winding, preferably operates from an ungrounded cathode heater supply in order to prevent the possibility of current leakage from the main control condenser 327 to ground.

Iron core inductances 108 and 109 in series with each other and the negative terminal of the rectifier, and in combination with shunt condensers 110, 111 and 112 connected as shown in Fig. 2A, form a conventional filter network which smooths the pulsating direct current delivered by the rectifier tube V107 into a more or less steady direct current, in the usual manner. The bus conductor 120 connected to the filter terminal P constitutes the positive terminal of the filter, and the bus conductor 128 connected to the filter terminal N constitutes the negative terminal of the filter, the voltage maintained between these two points being of the order of 305 volts. A resistor 113 and a condenser 114, connected in series between the negative terminal of the rectifier and terminal N of the main filter, constitute a supplementary filter which provides at the circuit point 115 a voltage approximately 30 volts more negative than that available at the point N. Condensers 116 and 117, and resistors 118 and 119 constitute a voltage-divider-filter combination bridging the main filter between its terminals P and N. The cross connection 122 is connected to ground and the resistor sections 118*a*, 118*b*, 119*a*, 119*b* and 119*c* are so proportioned and their taps 120, 121, 123, 124, 125, 126, 127 and 128 so adjusted that voltages of the order of the following are available at the respective taps:

| Tap | Approximate voltage (D. C.) with respect to ground |
|---|---|
| 120 | Positive 250 v. |
| 121 | Positive 90 v. |
| 122 | Positive 0. |
| 123 | Negative 5½ v. |
| 124 | Negative 9½ v. |
| 125 | Negative 34 v. |
| 126 | Negative 35 v. |
| 127 | Negative 45 v. |
| 128 | Negative 55 v. |
| 115 | Negative 85 v. |

The details of the described power supply unit 26 form no part of the invention. Any supply system capable of furnishing the necessary voltages to the gain control unit 28 and variable-gain amplifier 27 may be used equally as well.

*Variable-gain amplifier 27*

Briefly considered, this amplifier comprises manually adjustable input and output signal attenuators 200 and 241, respectively, which are shown in block outline. Following the input attenuator 200 are two variable-gain stages of push-pull amplification 30 and 31, respectively including the vacuum tube pairs V204, V205 and V209, V210. Variable bias for controlling the gain of these tubes is applied to the control grids thereof from the gain control unit 28 via a connection 300, as explained in full below. Following the second stage of variable gain amplification there is provided a push-pull stage 32 of fixed-gain voltage amplification, which employs two vacuum tubes V220 and V223, and a conventional fixed-gain power amplification stage 33 of the push-pull type which delivers its output to the output attenuator 241 and employs two vacuum tubes V231 and V236.

More specifically, the input attenuator 200 is coupled to an input coupling transformer 201, the secondary winding of which is center-tapped and shunted by a center-tapped resistor 202. The end terminals of this secondary connect to the remote cut-off control grids G1 of the tubes V204 and V205. The sharp cut-off control grids G3 of the tubes V204 and V205 are connected together and to the centertaps of the secondary winding of the transformer 201 and the resistor 202. Both control grids of both tubes V204 and V205 are connected to the bias connection 300 through a resistor 203, the grid end of which is shunted to ground by a delay condenser 203*a*. The screen grids G2 and G4 of the tubes V204 and V205 are connected together, and connect to the high voltage +B bus 120 through an unbypassed resistor 206. The anodes of the tubes V204 and V205 are connected to opposite end terminals of the primary winding of an interstage coupling transformer 208, and connect to the +B bus 120 through the centertap of this primary winding and the centertap of a resistor 207 which shunts the primary winding. Both of the resistors 202 and 207 are employed to level out the frequency characteristics of the transformers 201 and 208, in a well-known manner. The suppressor grids G5 and cathodes of the tubes V204 and V205 are connected together and grounded.

From inspection of the circuit it will be seen that the secondary winding of the interstage coupling transformer 208, and the remote cut-off and sharp cut-off control grids of the tubes V209 and V210 provided at the second amplifier stage 31, are connected together and to the bias connection 300 in the same manner as in the preceding stage 30, except that no resistor is interposed between the bias connection 300 and the grids of the tubes V209 and V210, no bypass condenser is connected to the grids, and the secondary winding of the transformer 208 is not resistor shunted. The screen grids of the tubes V209 and V210 are connected together, and connect to the +B bus 120 through an unbypassed resistor 211. The anodes of the tubes V209 and V210 are connected to opposite ends of the serially related resistors 212, 213 and 214, and connect to the +B bus 120 through the adjustable balancer tap on the resistor 213.

Aside from a feature of its input circuit which aids in suppressing objectionable voltage transients generated by the rapid response of the second stage 31 of variable-gain amplification to audio frequency changes in control bias, the third stage of amplification 32 is a conventional push-pull, fixed-gain voltage amplifier. Briefly, the control grids G1 of the tubes V220 and V223 are coupled to the anodes of the preceding tubes V209 and V210 respectively, through coupling condensers 215 and 217, and are also connected to grid resistors 218 and 219. Cathode biasing of the tubes is employed at this stage, unbypassed bias resistors 221 and 222 being used for this purpose. The junction point between the four resistors 218, 219, 221 and 222 is connected to ground through a transient suppressor resistor 216. The screen grids G2 of both of the tubes V220 and V223 are connected together and to the +B bus 120; while the anodes of both tubes are connected together through resistors 226 and 227, and the junction between these two resistors is connected to the +B bus 120.

The fourth amplifier stage 33 is coupled to the preceding stage 32 by a resistance-capacitance coupling network comprising condensers 225 and 228 and grid resistors 232 and 235. The cathode bias resistor 233 is bypassed in the usual manner by a condenser 234 and the junction of the resistors 232, 233, 235 is grounded. Anode voltage is applied to the anodes of the tubes V231, V236 through opposite ends of the primary winding of an output transformer 240 having a centertap which connects to the +B bus 120. In order to provide inverse feedback from the output side of this fourth amplifier stage 33 to the third amplifier stage 32, thereby to minimize signal distortion, reverse feedback series resistor-capacitor combinations 224, 230 and 229, 237 are provided which are connected between the anodes of the tubes V231 and V236 and the cathodes of the tubes V220 and V223. The secondary winding of the transformer 240 is connected to the output attenuator 241, from which the amplified signal output of the variable-gain amplifier 27 is available for further transmission through the limiting amplifier 16 to the radio transmitter 17 shown in Fig. 1 of the drawings.

*Gain control unit 28*

In general, the purpose of this unit is to analyze the output signal level of the variable-gain amplifier 27, and develop a bias voltage which varies the gain of this amplifier in the correct sense to maintain the signal level at the output side of the amplifier within predetermined limits. Specifically, this unit includes a gain control and indicator network 34 having the immediate function of varying and indicating the gain of the two variable gain stages 30 and 31 of the amplifier 27. This network includes a three element tube V304 acting as the gain control and indicator tube, and having an anode connected to the tap 121 of the power supply unit 26 so that it is normally maintained approximately 90 volts D. C. positive with respect to ground. The cathode of this tube is connected to the tap 124 of the power supply unit 26 (which is approximately 9½ volts D. C. negative with respect to ground) through a pair of cathode resistors 305 and 306 and a gain indicator 307 in the form of a milliammeter having a range of 0–1 milliamperes. In order adjustably to change the magnitude of the bias voltage applied to the bias connection 300, the cathode resistors 305 and 306 are incorporated in a voltage dividing network which additionally includes resistors 302 and 303 and a three position switch 301. Specifically, the bias connection 300 delivers to the control grids of the tubes V204, V205, V209, V210, in the variable-gain stages 30 and 31 of the amplifier 27, a bias voltage which, when the switch 301 is in position A, is the voltage existing at the junction between the resistors 305 and 306, and ground. This bias voltage becomes several volts more negative, however, when the switch 201 is moved to position B since, in that position of the switch, the short circuit is removed from the resistor 302, resistors 302 and 303 form a voltage divider across the resistor 306, and the bias connection 300 taps in at the junction between the resistors 302 and 303. The control grid of tube V304 is connected to the anode of tube V320.

In order to provide an automatic gain decrease when required, a gain decreasing network 35 is provided which comprises a twin diode tube V315 connected as a full wave rectifier across the output circuit of the last stage 33 of the variable-gain amplifier 27. Specifically, the anodes of this tube are coupled to the primary winding terminals of the transformer 240 through conductors 238 and 239, resistors 310 and 311 and coupling condensers 312 and 313, and are bridged by a center-tapped resistor 314. The two cathodes of the tube V315 are connected together and to one end of a load resistor 316. The rectifier circuit is completed from the opposite end of the resistor 316 to the centertap of the potential resistor 314, which is maintained at approximately 85 volts negative potential with respect to ground by a connection 317 leading to the tap 115 in the power supply unit 26. Actual gain decrease control is effected by a pentode tube V320, under the control of the tube V315, the tube V320 being provided with a control grid G1 connected directly to the cathodes of the tube V315, a grounded screen grid G2, and a suppressor grid G3 and cathode which are both biased to approximately 55 volts negative potential with respect to ground by connection to the —B bus conductor 128 of the power supply unit 26. Normally, the anode of the tube V320 has no direction connection to a source of anode potential, although it is coupled through the main gain control condenser 327 to the tap 123 of the power supply unit 26, which as noted above, is maintained at approximately 5½ volts negative potential with respect to ground, or is approximately 49½ volts more positive with respect to ground than the cathode of the same tube. Interposed between the anode of the tube V320 and the circuit point 326 are two parallel resistor-capacitor circuits in series, which respectively comprise a resistor 323 and a condenser 322, and a resistor 325 and a condenser 324.

Signal controlled automatic gain increase in the amplifier 27 is effected under the control of the gain increasing section of the control unit 28, which, in general comprises a gain increasing network 37, an upper threshold gain increase disabler 38, a lower threshold gain increase disabler 39, a gain increase delay and delay restorer network 40 and a gain increase signal analyzer 41 having input terminals coupled to the output side of the amplifier 27 over a channel including the conductors 238 and 239. Specifically, the gain increasing unit 37 comprises a tube V330 which serves the immediate function of controlling the magnitude and duration of gain increases by governing the magnitude and rate of voltage build up across the main control condenser 327. Circuitwise, the anode, suppressor grid G3 and screen grid G2 of the tube V330 are connected to the +B bus 120 through a pair of resistors 336 and 340; the control grid G1 and cathode of this tube are connected to opposite ends of a cathode resistor 331; and the G1 grid of this tube and the lower end of the resistor 331 are connected to the upper terminal of the main control condenser 327. Normally the cathode of the tube V330 has no direct connection to the power supply unit 26. Through the main control condenser 327, however, it is connected to the tap 123 of the power supply unit, which is maintained at approximately 5½ volts negative potential with respect to ground. Also, connected to the upper terminal of the condenser 327 are two leak resistors 332 and 334 which are respectively utilized to effect decreases and increases in the gain through the amplifier 27. Specifically, the resistor 332 connects with the 55-volt —B bus conductor 128 through the normally-open gain-down push-button switch 333, and the resistor 334 connects with ground through the normally-open gain-up push-button 335.

In order to control the rate of gain increase in the manner fully explained below, a gain increase rate selector switch 339 is provided in the gain increasing network 37. This switch has three positions N, M and F representing, respectively, "No gain increase," "Medium gain increase," and "Fast gain increase." In position N of the switch 339, the anode of the tube V330 is connected directly to the 55-volt —B bus conductor 128, such that the tube is entirely disabled, and current flows from the +B bus 120 through the resistors 340 and 336, and the switch 339 back to the power supply unit through the bus 128. When the switch 339 occupies position M, current flows in the same manner through the resistors 340 and 336; thence through the resistor 337 and the switch 339 back to the power supply unit through the bus 128. During current flow in the last-described circuit, the anode of the tube V330 is at the potential appearing at the junction of the resistors 336 and 337, and under certain conditions is positive relative to the tube cathode such that the tube may draw anode current. In switch position F, current flows from high voltage D. C. bus 120 through the resistors 340 and 338 and the switch 339 back to the power supply unit through the bus conductor 128. In this switch position maximum anode voltage is impressed on the tube V330, which under certain conditions, may draw anode current.

Both the upper threshold gain increase disabler tube V341 and the lower threshold gain increase disabler tube V345, respectively provided in the upper and lower threshold disablers 38 and 39, also receive anode power through resistor 340, their anodes being connected together and to the upper end of the resistor 340. The cathode of the tube V341 is connected directly to the tap 125 of the power supply unit 26, and in consequence is biased to approximately 34 volts D. C. negative with respect to ground. The control grid of this tube is connected to the G4 grid of the tube V345 through a resistor-capacitor network comprising the shunt connected condenser 344 and resistor 343. This network has the function of limiting the amount of gain increase effected at the start of each on-signal period, i. e. each period during which signal transmission through the amplifier 27 occurs. A positive potential of approximately ten volts is supplied to the grid G5 of the gain increase disabler tube V345 from the tap 127 of the power supply unit 26.

Control of the bias potentials applied to the control grid of the disabler tube V341 and the inner G1 grid of the disabler tube V345 is effected through the action of the gain increase signal analyzer 41 cooperating with the tube V360 forming a part of the gain increase delay and delay restorer network 40. Specifically, the signal analyzer 41 is in the form of a full wave rectifier employing a twin diode V373 having its anodes bridged by a resistor 372 and coupled respectively to the signal input conductors 238 and 239 through the coupling condensers 370 and 371. The mid-point of the anode resistor 372 is tapped and connected to both cathodes of the two diode sections through the rectifier load circuit which comprises a load resistor 376 shunted by a delay condenser 375 and connected in series with an unbypassed load resistor 374. The junction point between the two load resistors 374 and 376 is connected to the —B bus conductor 128 which is also connected to the cathode of the tube V345, whereby the voltage drop developed across the resistor 376 during signal rectification may be negatively applied to the inner control grid G1 of the gain increase disabler tube V345 over the circuit conductor 346.

An adjustable portion of the rectified signal voltage appearing across the second load resistor 374 is positively applied to the control grid of the tube V360 which directly functions to control the starting and stopping of charging current flow through the gain increase delay condenser 364. Specifically that portion of the rectified signal voltage developed between the lower end of the resistor 374 and the tap adjustable along this resistor is positively applied to the control grid of the tube V360. The anode of the tube V360 is connected to the grounded conductor 122 which is at a potential approximately 55 volts positive with respect to the —B bus conductor 128. In the cathode leg of the output circuit of this tube a charging resistor 365 is provided for the condenser 364. In order adjustably to change the rate of charging of the condenser 364 thereby to determine the gain increase delay time, this condenser may be bridged across the charging resistor 365 either directly through the contacts of a control switch 362 or through a delay resistor 363. The voltage developed across the condenser 364 during the on-signal period is positively applied to the control grid of the gain increase disabler tube V341 in opposition to a negative bias of 21 volts, i. e. that between the taps 125 and 128 of the power supply unit, which is impressed upon this control grid through the resistor 365.

The gain increase delay and delay restorer network 40 performs the additional function of preventing unwanted gain increases during low level passages which may follow off-signal periods in the handling of music programs. To this end, the network 40 additionally comprises a twin triode tube made up of two triode sections V350 and V353 to which anode potentials are supplied through the voltage dropping resistors 357 and 358, respectively. The input electrodes of the triode section V350 are bridged across an R-C network comprising a resistor 351 and condenser 352, the condenser leg of which is charged during each off-signal period by space current flow between the G2 grid and cathode of the tube V345. This timing network performs the function of permitting a gain increase during an initial predetermined time interval of each on-signal period, the duration of the interval being determined by the time constant of the network. Normally, the control grids of two triode sections V350 and V353 are maintained at zero bias potential, the described R-C network serving to provide a cut-off bias for the tube section V350 during each off-signal period. The biasing circuit for the grid of the triode section V353 includes a pair of resistors 354 and 355 combined with a condenser 356 having the function of discharging through the last-mentioned resistor to develop a cut-off bias upon the control grid of the triode section V353 a predetermined time interval following the start of each on-signal period. This triode section cooperates with a condenser 359 connected between the anode of the identified triode section and the anode plates of the diode section in the tube V360 to pass current through a resistor 361 during each interval when space current flow through the triode section V353 is cut off. In other words, the condenser 359 cooperates with the resistor 361, the triode section V353, and the diode section of the tube V360 artificially to develop a pulse of charging current which is passed through the gain increase delay control condenser 364 a predetermined time interval after the start of each on-signal period, thereby to prevent continuance of an unwanted gain increase.

*Operation of the variable-gain amplifier 27*

Briefly considering the operation of the system shown in Figs. 2A and 2B of the drawings, it is pointed out first that the variable-gain amplifier 27 receives an audio frequency signal voltage from the preceding amplifier 14 of the audio frequency signal channel, through the input attenuator 200, variably amplifies the signal voltage and delivers the amplified signal voltage through the output attenuator 241 to the transmitter 17 for modulation of a signal carrier. The degree of amplification, or gain, of the amplifier 27 varies with the level of the output signal, within predetermined limits, and within those limits is an inverse function of the signal output level. This gain control is effected only in the first two stages 30 and 31 of the amplifier since, as noted above, the third stage 32 is a conventional fixed-gain push-pull voltage amplifier provided with a special transient-suppressing circuit, and the fourth stage 33 is an entirely conventional fixed-gain push-pull power amplifier with inverse feed-back to the third stage.

As indicated above, the tubes V204, V205, V209 and V210 are of the type usually called pentagrid mixers having five grids between cathode and anode. The G1 grid, nearest the cathode of each tube, is a remote cut-off control grid, and the third grid G3 from the cathode is a sharp cut-off control grid. Such tubes, when connected in pairs in push-pull, provided with an unbypassed screen resistor 206 or 211 of appropriate size and signal energized on their G1 (remote cut-off) grids, exhibit a variable-gain characteristic when both of the G1 (remote cut-off) and G3 grids are connected to a variable bias voltage such as that supplied by bias connection 300. Specifically, the gain of the push-pull amplifier stage is varied as an inverse linear function of the bias voltage over a considerable bias voltage range. This characteristic is well understood in the art. Two such variable-gain amplifier stages are employed. Thus the incoming signal, after passing through the input attenuator 200 and input coupling transformer 201, is variably amplified at the first stage 30, transmitted through the interstage coupling transformer 208, and is further variably amplified in the second stage 31. The gain within each of these two stages is continuously variable, under the control of the bias voltage delivered from the gain control unit 28 over the bias connection 300. In the circuit shown, the bias voltage range is from approximately 3.2 volts to approximately 9.4 volts negative with respect to ground, which varies the gain of the first stage linearly from approximately $-8\frac{1}{2}$ to $+15$ db and the second stage from $+2\frac{1}{2}$ to $+19$ db, resulting in an over-all gain range for the entire amplifier of from 12 db to 52 db. Maximum gain accompanies the least negative bias voltage (3.2 volts) and minimum gain accompanies the most negative bias voltage (9.4 volts).

The first variable-gain stage 30 is characterized by a delayed gain response characteristic; i. e., its gain variations do not occur simultaneously with bias voltage changes, but lag the bias voltage variations by some milliseconds. This delay is provided by the time delay network comprising the resistor 203 and the condenser 203*a*, which function here in the same manner as in delayed automatic volume control circuits which are familiar to those skilled in the electronic arts. It has been found that this response delay in the first stage is highly desirable, since it prevents generation of objectionable transient voltages caused by the effect of rapid bias-voltage variations upon unbalanced tubes or unbalanced coupling transformers, which would appear as unwanted noise in the amplifier output. Values of 500,000 ohms for resistor 203 and .1 mfd. for condenser 203*a* produce a response delay of approximately 50 milli-seconds, which has been found adequate to prevent unwanted transient build up and yet small enough to permit the gain to follow bias voltage variations with such satisfactory rapidity that no objectionable lag is evident in the amplified output. No response delay has been found necessary in the second amplifier stage 31, probably because (*a*) tube unbalance in the second stage can be almost entirely compensated for by adjustment of the variable tap along the anode resistor 213, (*b*) the arrangement of the cathode circuit of the third stage affords automatic local transient suppression, and (*c*) voltage transients generated in the second stage are not amplified sufficiently to become objectionable at the output side of the amplifier. It is desirable, moreover, that the second variable-gain stage possesses an almost instantaneous response characteristic, in order most effectively to control the rapid gain variations required in handling such types of signals as multiple-voice speech programs.

From the second amplifier stage 31 the signal is fed to the third stage 32 through the coupling condensers 215 and 217 and the grid resistors 218 and 219. The signal is further amplified in the fixed-gain third stage in an entirely conventional manner, and delivered to the final fixed-gain power-amplifier stage 33 through the coupling condensers 225 and 226. The operation of this final stage, including the action of the inverse feed-back circuits 224, 230 and 229, 237, is entirely conventional and requires no explanation. From the output side of the final amplifier stage the signal is transmitted through the output coupling transformer 240, the output attenuator 241 and the limiting amplifier 16 to the radio transmitter 17. The output signal is also fed to the gain control unit 28 via the conductors 238 and 239, there to be analyzed for the purpose of controlling the gain of the first two stages of the amplifier 27.

Local transient suppression is effected in the third amplifier stage by the resistor 216. More specifically, sudden changes in the control grid bias of the second variable-gain stage tubes V209 and V210 cause equally rapid and in phase variations in the anode currents of these tubes, and hence corresponding in phase and like polarity variations in the potentials applied to the grids of the tubes V220 and V223. These grid potential changes cause additive current components to traverse the resistor 216 by way of the two tubes V220 and V223. The resulting voltage drop across the resistor 216 is degenerative in the output circuits of the tubes V220 and V223 in that it limits the voltage changes produced across the output resistors 226 and 227 as a result of the in phase changes in the grid potentials of the tubes V220 and V223. The extent of this limiting action is determined by the relative resistance values of the resistors 216 and the output resistors 226 and 227. Thus the greater the resistance of the resistor 216 relative to the resistance of each of the resistors 226 and 227, the greater the degenerative effect for in phase variations in the grid potentials of the tubes V220 and V223. By properly proportioning the resistance values of these resistors, very nearly complete cancellation of the rapid effect of the changes in the bias voltages applied to the grids of the tubes V209 and V210 is obtained. Good results have been obtained by using a resistor 216 of 75,000 ohms and resistors 226 and 227 of 40,000 ohms each. Normal signal voltages, which appear in opposed phase relation across the two output resistors 212 and 214, produce cancelling or out of phase current components in the resistor 216. Hence, the described degenerative feed back action does not occur in response to signal excitation of the tubes V209 and V210.

Balancing of the third and fourth amplifier stages 32 and 33 is obtained by adjusting the adjustable tap along the resistor 213. To this end, a power level meter, not shown, is connected across the output terminals of the amplifier 27, and the output attenuator 241 is adjusted for minimum loss (i. e., maximum output). With the amplifier 27 and gain control unit 28 both in operation, the switch 301 is snapped from its A to its position B. As above stated, this has the effect of instantaneously driving the bias voltage of the two variable-gain stages 30 and 31 several volts more negative than normal. If either pair of tubes V209, V210 or V220, V223 is unbalanced, this sudden bias voltage change will generate a transient response which manifests itself as a "kick" of the power level meter. For best tube balance, the tap of the resistor 213 is adjusted until minimum kick of this meter is obtained when the switch 301 is snapped from its position A to its position B.

*Operation of the gain control unit 28*

As previously pointed out, the gain control unit 28 analyzes the output signal level of the variable-gain amplifier 27, and furnishes to the two variable-gain stages of this amplifier a bias voltage which varies as an inverse function of the signal level at the output side of the amplifier. Thus, the gain of the amplifier 27 is varied in such a manner that its output level is automatically maintained within certain predetermined limits, in spite of variations of the incoming signal level which, unchecked, would cause the output signal greatly to exceed these limits in both directions. In general, this is accomplished by employing the rectifier tubes V315 and V373 continuously to sample the output signal of the variable-gain amplifier, as it is fed to these tubes over the channels comprising the conductors 238 and 239. These rectifier tubes convert the signal samples into rectified direct currents which, in traversing the respective rectifier load resistors 316 and 374, 376, produce D. C. voltage across the resistors which vary in magnitude in accordance with the signal level at the output side of the amplifier 27. These voltages so control the other vacuum tube circuits of the unit 28 that a varying bias voltage is supplied to the control grid of the gain control tube V304. Specifically, the voltage developed in the load circuit of the tube V315 initiates gain reductions when the output level of the amplifier 27 becomes too high and the voltage developed in the load circuit of the tube V373 initiates gain increases when the output level of the amplifier becomes too low. The tube V304 receives as its grid bias a voltage which is a summary of all the detailed reactions of the preceding components of the gain control unit 28 to the output signal level of the amplifier 27. This bias voltage determines the magnitude of anode current flow through the tube V304, the cathode resistors 305 and 306 and the gain indicator meter 307, thus varying the voltage drop across these resistors and the meter in accordance with the reaction of the preceding components of the gain control unit to the output signal level of the amplifier 27.

As explained above, the voltage existing at the junction point between the resistors 305 and 306 is impressed upon the control grids of the two variable-gain stages 30 and 31 of the amplifier 27 over a path which includes the switch 301 (in position A) and the bias conductor 300. Since the magnitude of anode current flow through the tube V304 varies from zero to a maximum of 1 milliampere, the bias voltage appearing between the conductor 300 and ground varies from a maximum, under conditions of zero anode current, of approximately 9.4 volts negative with respect to ground (this being the voltage maintained at tap 124 on the power supply), to a minimum, under conditions of 1 milliampere maximum anode current, of approximately 3.2 volts negative with respect to ground (this being the difference between the 9.8-volt potential at tap 124 and the opposing 6.6-voltage trop across the resistor 306 and the meter 307 when 1 milliampere anode current flows through these circuit elements). Thus, the gain of the amplifier 27 is variable from a maximum at 3.2 volts bias to a minimum at 9.4 volts bias. Minimum amplifier gain depends upon the voltage at the tap 124, and may be varied to afford greater or less gain by adjusting this tap along the resistor 119*a*. Maximum amplifier gain depends upon the combined resistances of the resistor 306 and the meter 307, and increases as this combined resistance is increased. Since the gain of the amplifier 27 is proportional to the magnitude of anode current through the tube V304 and the meter 307, this meter actually indicates the gain of the amplifier, and may be calibrated to read in such terms, i. e. in db. The function of the switch 301 and the resistors 302, 303 is solely that of providing a method of testing the balance of the tube pairs V209, V210 and V220, V223 in the manner fully explained above. Normally, the switch 301 remains in the position A.

The bias voltage impressed upon the control grid of the tube V304 is the voltage appearing at the point 321, i. e., the sum of the voltages appearing across the resistor 323 and the condensers 324 and 327, and between the taps 123 and 124 of the power supply unit 26. Since the capacitor 322 is relatively small, it has little effect on the voltage at the point 321, other than to suppress small transients by limiting slightly the rate of voltage build up across the resistor 323. Its presence for that purpose is desirable though not essential. Variations in the voltage at the point 321 are obtained by charging the two capacitors 324 and 327 in one sense to obtain gain decrease and charging the condenser 327 in the opposite sense to obtain gain increase, either automatically or by manual manipulation of the push-button switches 333 and 334. Specifically, the gain of the amplifier 27 may be varied over its entire gain change range by varying the voltage across the condenser 327 from —5½ volts to +5½ volts, a voltage range of 11 volts. For mid-range operation of the gain control unit 28, no voltage is present on the condenser 327.

Under a condition of no signal input to the amplifier 27, the gain control unit 28 is inactive such that the condenser 327 has no charge thereon and the bias voltage present between the bias conductor 300 and ground is at a value approximately at the center of the working bias voltage range. This value of the bias voltage is established either through previous operation of the equipment or through an automatic drift to this value following a period of non-use of the equipment. Thus, under a condition of no signal output from the amplifier 27, the tube V315 is inoperative and hence no rectified signal voltage is present across the resistor 316. Accordingly, the control grid G1 of the tube V320 is biased approximately 30 volts negative with respect to its cathode, its G1 grid being connected to the 85 volt negative tap 115 of the power supply unit 26 through the resistor 316, and its cathode being connected to the 55 volt negative tap 128. This bias is of the order of 25 volts more than the anode current cut-off bias for a tube of the type used and hence the tube V320 is unable to draw anode current and has no effect upon the voltage at the point 321 or the gain of the amplifier 27.

Also, under a condition of no signal output from the amplifier 27, the triode section of the tube V360 is self-biased to a point near cut-off, due to the fact that no rectified signal voltage appears across the resistor 374. Under these circumstances, the bias applied to the control grid of the triode V341 is equal to the voltage between the —B conductor 128 and the tap 125 of the power supply unit 26 less the residual voltage of approximately 1½ volts across the resistor 365, and is of a magnitude far in excess of cut-off value of this tube. Further, since the rectifier tube V373 is inactive, no voltage is present across the resistor 376. Hence, the bias voltage between the G1 grid and cathode of the tube V345 is zero with the result that this tube is fully conductive. Plate current flow through this tube follows a path extending from the +B bus conductor 120 through the resistor 340 and the space current path through the tube V345 back to the —B bus 128. This current flow produces a large voltage drop across the resistor 340 sufficient to reduce the anode potential of the tube V330 to a value only slightly positive or actually negative with respect to the cathode of this tube. Accordingly, the tube V330 is rendered substantially non-conductive and hence is ineffective appreciably to charge the control capacitor 327.

*Speech signal input to the amplifier 27*

Operation of the gain control unit in response to speech signal input to the variable gain amplifier 27 may best be explained by reference to Fig. 3 of the drawings which graphically illustrates the performance of the system under the condition of typical speech signal transmission through the amplifier 27. Specifically, the curves I, O and G of the graph shown in Fig. 3 of the drawings represent the changes which occur in the signal input level, the signal output level and the gain of the amplifier 27 during the transmission of seven sentences of a typical two-voice speech program through the amplifier 27. These curves are plotted as a function of time on a decibel change basis, the curves I and O also being co-ordinated on the basis of percentage change in the modulation of the signal carrier upon which the signal is impressed for radiation by the transmitter 17. By way of explanation it is noted that the first two sentences are representative of the speech of a single persion who speaks at a normal voice level. The third and fourth sentences are representative of voice signal voltages resulting from the speech of a different person having a voice level about six db lower than the voice level of the first person. Following the fourth sentence three additional sentences originating with the first speaker are illustrated.

When the first voice represented by the curve I in Fig. 3 of the drawings starts to speak, a signal voltage appears between the conductors 238 and 239 at the output side of the amplifier 27 which is rectified by the tube V373 and appears across the resistor 376 as a bias voltage which is negatively applied to the control grid G1 of the tube V345. This voltage cuts off anode current flow through the tube V345 when the rising signal voltage across the conductors 238 and 239 reaches a lower threshold value about 20 db below the maximum threshold level. When anode current flow through the tube V345 is cut off, the voltage drop across the resistor 340 decreases to zero with the result that the anode of the tube V330 is permitted to assume a large positive voltage relative to its cathode. Anode current now flows from the +B bus conductor 120 through the resistors 340 and 336, the space current path through the tube V330 and the control condenser 327, charging this condenser in a positive sense. The potential thus produced at the circuit point 328 is positively applied to the control grid of the tube V304 to render the tube V304 increasingly conductive. The increasing space current flow through the tube B304 effects a decrease in the negative potential at the circuit point 301 and hence a decrease in the bias viltage appearing between the conductor 300 and ground. Accordingly, the gain of the amplifier 27 is increased to produce a resulting increase in the signal output level.

At this point it is noted that the rate at which the condenser 327 is positively charged to produce again increase, is determined by two factors, i. e. the magnitude of the voltage applied to the anode of the tube V330 and the value of the resistor 331. The first factor is adjustable, while ordinarily the resistance value of the resistor 331 is fixed at a relatively high value of the order of 13 megohms. With the particular circuit arrangement illustrated, the tube V330 functions as a current regulator such that for a given applied anode voltage the space current flow therethrough is constant. This function is of major importance in the operation of the system since it means that charging of the condenser 327 in a positive sense proceeds at a constant rate regardless of the amount or character of the charge already present on the condenser. More specifically considered, for a given applied anode voltage, the current through the tube V330 is determined by the bias applied to its control grid, i. e. the voltage drop across the resistor 331. This means that if the current through the tube tries to increase, the bias on the control grid of the tube tends to increase to prevent the current increase and vice versa. When a large resistor 331 is used in particular, excellent current regulation is obtained. Thus it will be understood that the rate of charging of the condenser 327 in a positive sense is constant and is completely independent of the state of residual charge of this condenser.

Assuming that the voice signal input level to the amplifier 27 is entirely adequate to provide the desired level of signal output, the described increase in gain through this amplifier indicated along the gain curve G in Fig. 3 of the drawings is only allowed to persist for a very short time interval B1. Thus, concurrently with the circuit operations described above, the output signal voltage appearing across the conductors 238 and 239 and rectified by the tube V373 effects the production of a direct voltage across the load resistor 374 included in the output circuit of the tube V373. This voltage, or more properly, the selected portion thereof, is positively applied to the control grid of the tube V360 to increase space current flow through this tube. Specifically, the path of space current flow through the tube V360 extends from ground through the space current path of this tube and the cathode resistor 365 to the —B bus conductor 128, the ground point of the voltage dividing resistor in the power supply unit 26 being at a potential approximately 50 volts positive with respect to the —B bus conductor 128. The resulting increase in the voltage drop across the resistor 365 has the effect of increasing the charge of the condenser 364 at a rate determined by the relative impedance values of this condenser and the resistor 363. Due to the delaying action of the resistor 363 included in this circuit, the voltage increase across the condenser 364 proceeds at a comparatively slow rate. As the voltage builds up across this condenser, it is positively applied to the control grid of the tube V341 over the conductor 342 in opposition to the 21 volt bias normally applied to this grid from the power supply unit 26. When the net bias on the control grid of the tube V341 is reduced to a value of 17 volts, space current flow through this tube is started to build up a voltage drop across the resistor 340. Specifically, space current flow through the tube V341 follows a path extending from the +B bus conductor 120 through the resistor 340 and the space current path of the tube back to the tap 125 of the power supply unit 26. As the current in this circuit, and hence the voltage across the resistor 340 increases, the voltage applied to the anode of the tube V330 is decreased until it finally becomes only slightly positive or actually negative with respect to the cathode of this tube, at which point space current flow through the tube is arrested. Thus, charging current flow through the control condenser 327 is stopped to arrest the increase in space current flow through the control tube V304 and hence arrest the decrease in the bias voltage appearing between the bias conductor 300 and ground.

During the initial signal input period to the amplifier 27 and while the above described action is occurring in the circuit, the gain decreaser network 35 has no control of the gain control tube V304. Specifically, when a signal output voltage appears across the conductors 238 and 239 at the output side of the amplifier 27, this voltage is rectified by the tube V315 to produce current flow across the load resistor 316. The resulting voltage drop across this resistor is positively applied to the control grid G1 of the tube V320. Normally this tube receives a negative grid to cathode bias from the point 115 of the power supply unit 26 which is of the order of 30 volts, i. e. a value approximately 25 volts in excess of the anode current cut-off value for a tube of the 6J7 type. Thus, until the rectified signal voltage appearing across the load resistor 316 exceeds a value of 25 volts, the tube V320 is biased beyond cut-off to prevent anode current flow therethrough. Hence, this tube and its associated control circuit have no effect in controlling the magnitude of space current flow through the gain control tube V304 so long as the signal output level of the amplifier 27 does not exceed a predetermined maximum threshold value. This maximum threshold value is appreciably higher than the upper threshold value at which the tube V341 stops gain increases in the manner explained above.

From the preceding explanation, it will be understood that when the voice signal is impressed upon the input circuit of the amplifier 27, the gain control unit acts to increase the gain through the first two stages of this amplifier by lowering the bias potential appearing upon the conductor 300. This increase is checked however, through the action of the network comprising the circuit elements 363, 364 and 365 to build up space current flow through the tube V341. This has the effect of cutting off or so reducing space current flow through the tube V330 that charging current flow through the main control condenser 327 is terminated. The permitted momentary rise in gain is not so appreciable as to be detectable.

Shortly following the initial signal input to the amplifier 27 and again referring to the signal input level curve I shown in Fig. 3 of the drawings, a high signal peak A1 appears in the signal input pattern. This peak, which is measured in a fraction of a second along the time axis, actually is the envelope of a large number of audio frequency cycles. After amplification through the amplifier 27, this audio voltage appears across the conductors 238 and 239 and is rectified by the full wave rectifier V315 to appear as a series of voltage pulses across the resistor 316. Since there is no appreciable capacitance shunting this resistor, each half cycle of the audio signal voltage is reproduced substantially without change except for the reversal in polarity of alternate half cycles. The voltage pulses thus developed are positively applied to the control grid G1 of the tube V320 in opposition to the normal bias of 30 volts impressed between this grid and the cathode of the tube. Each time one of the voltage pulses across the resistor 316 exceeds a value of approximately 25 volts, the tube V320 is rendered conductive to permit anode current therethrough over a path which extends from the tap 123 of the power supply unit 26 through the main control condenser 327, the condensers 324 and 322 in series and the space current path of the tube V320 to the —B bus conductor 128. Since this conductor is approximately 55 volts negative with respect to ground, and the tap 123 is approximately 5½ volts negative with respect to ground, the anode supply voltage for the tube V320 is approximately 49½ volts plus or minus the voltage across the condenser 327. Anode current flow over the above described path during the first current pulse through the tube resulting from the first half cycle of the audio signal voltage within the peak A1, causes a charge to be built up across each of the two condensers 324 and 322. More specifically, the current pulse through the tube V320 is divided between the condenser 322 and the resistor 323. These circuit elements have relative impedances such that the major portion of the current traverses the resistor 323. Also, this resistor is of relatively high impedance as compared with the impedances of the condensers 324 and 327 at the particular rate of current increase which normally prevails. Accordingly, the voltage drop developed across the resistor 323 during the initial current pulse through the tube V320 is relatively large as compared with the combined voltages developed across the two condensers 324 and 327. This resistance voltage drop is substantially in phase with the current and with the audio signal voltage half cycle responsible for its production. The described voltage developed across the resistor 323 is negatively applied to the control grid of the tube V304 to effect a reduction in space current flow through this tube which results in an increase in the negative bias voltage appearing between the bias connection 300 and ground. This increased bias potential on the conductor 300 is, of course, supplied to the control grids of the tubes in the two variable gain stages 30 and 31 of the amplifier 27. Due to the action of the delay network comprising the resistor 203 and the capacitor 203a, the described rapid increase in the negative bias potential upon the conductor 300 does not produce a corresponding decrease in the gain of the first amplifier stage 30. In the second amplifier stage 31, however, the described sharp decrease in the bias potential on the conductor 300 is effective to produce a corresponding decrease in the gain through this stage. This decrease in gain resulting from the first audio signal voltage half cycle of excessive amplitude has the effect of cutting off or chopping the peak of the voltage pulse. In other words, it prevents the half cycle of audio signal voltage from building up to full amplitude. Further, the above-described action of the suppresser circuit comprising the resistor 216 provided at the input side of the tubes V220 and V223 at the third amplifier stage 32 prevents the described sharp decrease in the gain of the second amplifier stage from effecting the production of an objectionable noise pulse which might otherwise be produced for transmission through the output circuit of the amplifier to the succeeding components of the signal channel.

When the first audio voltage pulse of excessive amplitude within the peak A1 has passed, the resistance voltage drop across the resistor 323 instantly disappears. Each of the capacitors 324 and 327, however, retains a small charge, it being noted in this regard that due to the high resistance value of the resistor 325, the condenser 324 only slowly discharges through this resistor. When the voltage across the resistor 323 disappears, the bias potential applied to the control grid of the tube V304 is correspondingly reduced to effect a corresponding increase in space current flow through this tube which in turn results in a corresponding decrease in the bias potential upon the conductor 300 and a corresponding increase in the gain of the second amplifier stage 31. Thus, this amplifier is permitted to recover the major part of the gain which it has lost, although full recovery is prevented by the retained charges upon the two condensers 324 and 327.

As each succeeding voltage pulse of excessive amplitude appears within the peak A1 of the signal input pattern I, the above described cycle is repeated so that the gain through the second amplifier stage 31 is alternately decreased as the peaks occur and allowed partially to recover during the valleys separating the peaks. Due to the rapidity of occurrence of the pulses, however, increasing voltages are built up across the two condensers 324 and 327 to effect a corresponding decrease in the proportion of the available voltage appearing as a voltage drop across the resistor 323 and hence a corresponding decrease in the amount of gain recovery in the second amplifier stage 31 during off pulse periods. Finally a point is reached at which there is practically no gain restoration at this amplifier stage during the off pulse periods. In other words, the first few voltage pulses, each representing a half cycle of the signal input voltage, have their peaks cut off due to the action of the resistor 323 in providing an adequate bias voltage for the control tube V304 during the interval required to build up charges across the two condensers 324 and 327. During this interval, the described circuit functions effectively as a peak chopper to vary the gain of the amplifier stage at an audio frequency rate, but the chopping is of such duration that no discernible distortion is produced in the amplifier output. This results in a very fast attack time in effecting gain reduction, which positively precludes over shoot of the signal output level beyond the desired maximum threshold point. After the required charges are accumulated on the condensers 324 and 327, the gain of the second stage 31 of the amplifier 27 is held in its depressed value to limit the succeeding signal voltage pulses of excessive amplitude. In the gain control unit 28, these succeeding pulses only have the effect of maintaining the charges upon the condensers 324 and 327.

After the peak A1 in the signal input pattern I has passed, the gain reduction in the second stage of the amplifier 27 is gradually recovered. Thus, as the signal voltage pulses of excessive amplitude terminate, charging current flow through the condensers 327 and 324 and the resistor 323 is arrested, permitting the condenser 324 to discharge through its shunting resistor 325. After a short time interval of the order of one second determined by the time constant of this shunt circuit, the voltage drop thereacross falls substantially to zero to effect a corresponding decrease in the bias voltage applied to the control grid of the tube V304. When circuit constants of the values given in the closing portion of this description are used for the illustrated circuit components, a dissipation of the charge accumulated upon the condenser 324 is found to account for recovery of approximately 80 percent of the gain reduction, assuming that the signal peak does not persist for an excessive time interval. The remaining 20 percent is retained pending a further control action in the circuit. More specifically, the amount of gain recovery accountable for by dissipation of the charge across the condenser 324 depends upon the duration of the peak A1 in the signal input level. Thus, the condenser 327, in the absence of a gain increase response of the gain control unit, causes substantially no change in the gain at the end of a gain decrease operation. This is true for the reason that the condenser 327 is only charged to a low negative voltage of the order of 5½ volts as a maximum during a gain decreasing operation and hence discharge thereof due to leakage is substantially negligible. The R.-C. circuit 324, 325 on the other hand is characterized by a relatively small time constant. This means that as the excess voltage pulses persist, a progressively increasing proportion of the available voltage appears as a voltage drop across the condenser 327 to effect a corresponding reduction in the voltage drop between the points 326 and 321 of the circuit. Hence, when the peak in the signal input level passes, the voltage across the condenser 324 which may be dissipated to effect gain recovery is small as compared with the voltage across the condenser 327, which latter voltage is retained to prevent gain recovery. Thus, the magnitude of gain recovery effected following the passing of a peak in the signal input level is inversely related to the length or duration of the peak. By reference to Fig. 3 of the drawings, and particularly the gain curve G thereof, it will be noted that the peak A1 in the signal input level I is of relatively short duration. Hence, substantially full gain recovery is obtained within a matter of approximately one second.

It will also be noted from these curves that after the signal input level peak A1 has passed, the gain G through the amplifier 27 is held at a substantially constant value over the major portion of the first sentence, excepting a small gain reduction produced at A2 in the gain curve G as a consequence of a small peak A2 in the signal input level. The constant gain level is maintained because of the fact that the gain decreaser network 35 remains entirely inactive so long as the signal input level does not exceed the maximum threshold value and the additional fact that the condenser 364 is charged to a steady state voltage through the tube V360 from the load circuit of the rectifier tube V373. Specifically, so long as the signal input to this rectifier tube remains above a predetermined level, a voltage appears across the resistor 365 which holds the condenser 364 charged to a value such that the gain increase disabler tube V341 passes current through the resistor V340 in excess of a predetermined value with the result that the gain increase tube V330 is rendered substantially nonconductive in the manner explained above.

Assuming that there is only a short pause between the first and second sentences and that the level of the second sentence is equal to that of the first, substantially no change is produced in the gain setting of the variable gain stages 30 and 31 of the amplifier 27. Specifically, when the first sentence ends, the signal input to the rectifier tube V373 is cut off with the result that the bias voltage developed across the load resistor 376 and negatively applied to the G1 grid of the tube V345 disappears. Accordingly, anode current flow through the tube V345 is restarted to prevent appreciable anode current flow through the gain increase tube V330. Thus, the gain of the amplifier 27 is prevented from increasing during the off-signal period, since the gain increase disabler tube V345 assumes the function of controlling the gain increase tube V330 to prevent an increase in the gain through the amplifier 27 before the alternate increase disabler tube V341 is rendered ineffective to perform this function. In this regard it is noted that during very short off-signal periods the delay condenser 375 prevents the voltage across the resistor 376 from dropping to a value at which the tube V345 is rendered conductive. Preferably, the condenser 375 and resistor 376 are relatively so proportioned that the tube V345 is only rendered conductive during normal inter-sentence pauses of normal speech and during the breath intake periods.

A second operation also occurs in the gain control unit 28 upon termination of signal input to the rectifier tube V373. Thus immediately the signal voltage across the conductors 238 and 239 drops to zero, the voltage across the load resistor 374 of the rectifier disappears, with the result that space current flow through the tube V360 is reduced to a very low value. As current flow through the resistor 365 is thus reduced, the condenser 364 starts to discharge through this resistor and the resistor 363 in series at a rate determined by the discharge time constant of the network comprising the elements 363, 364 and 365.

When the disabler tube V345 is rendered conductive in the manner explained above, an alternate discharge path is provided for the condenser 364, this path including the condenser 344 and the grid G4-cathode space path of the tube V345. As current traverses this discharge path, a voltage is built up across the small condenser 344 in opposition to the voltage across the condenser 364 until finally the potential on the G4 grid of the tube V345 is approximately zero. When condensers 344 and 364 of the values indicated below are used, approximately ⅕ of the charge stored in the condenser 364 is transferred to the condenser 344. Further, the time constant of this charging path for the condenser 344 is relatively small so that transfer of the charge from the condenser 364 to the condenser 344 occurs very rapidly. The resulting decrease in the voltage across the condenser 364 is sufficient to bias the disabler tube V341 beyond its space current cut-off point.

After the condenser 344 is thus charged, it starts to discharge through its shunt resistor 343 at a very slow rate determined by the long time constant of the circuit. As the charge on the condenser 344 is thus dissipated, the voltage thereacross decreases to gradually render the G4 grid of the tube V345 positive with respect to the cathode of this grid. As this occurs, the condenser 364 continuously discharges through the G4-cathode space path of the tube V345. It will thus be apparent that immediately signal input to the rectifier V373 is arrested, the condenser 364 is quickly relieved of ⅕ of its charge by the condenser 344, following which it continues to discharge through the G4-cathode space path of the tube V345 at a rate determined by the discharge time constant of the R.-C. circuit comprising the condenser 344 of the resistor 343.

One of the reasons for providing the above described auxiliary discharge path is that of imparting a smoother change in gain of the amplifier 27 in response to resumption of signal input to this amplifier. Thus, if the condenser 364 is fully discharged during normal inter-sentence pauses, for example, it must be completely recharged to stop a transient gain increase of the character indicated at B1 in Fig. 3 of the drawings and in the manner explained above when signal input to the amplifier 27 is resumed. With the illustrated arrangement, however, the condenser 364 is only permitted partially to discharge during off-signal periods of normal inter-sentence length, with the result that its normal charge is more quickly restored upon resumption of signal input to the amplifier 27 and the end result that the transient gain increase B2 which occurs at the start of the second sentence is of lesser amplitude than the initial transient gain increase B1. Specifically, the condenser 364 is rapidly discharged to decrease the voltage thereacross slightly below the 17 volt value at which the tube V341 is biased beyond cut-off.

During the second sentence illustrated by the curves shown in Fig. 3, gain reductions are successively effected automatically in the second amplifier stage 31 and in the exact manner explained above as the peaks A3, A4 and A5 occur in the signal input level pattern I. Due to the short duration thereof, each gain decrease is followed by substantially full gain recovery as the signal input peak passes.

As indicated above, the third and fourth sentences originate with a speaker having a voice output level approximately 6 db lower than the voice output level of the speaker responsible for the first two sentences. Accordingly, at the start of the third sentence, the gain control unit 28 permits an increase in the gain of the first two amplifier stages 30 and 31 sufficient to restore the desired signal output level. Specifically, when the third sentence starts, the tube V345 is immediately biased beyond cut-off by the voltage developed across the resistor 376 and an attempt is made to recharge the condenser 364 under the control of the tube V360. In this case, however, since the voltage developed across the resistor 374 is of sub-normal value, i. e. of a magnitude less than the residuary voltage of approximately 16 volts across the condenser 364, the condenser 364 is not immediately recharged. Accordingly, the disabler tube V341 remains biased beyond cut-off. As a result, appreciable space current flow through the tube V330 is permitted, which effects charging of the main control condenser 327 in a positive direction to decrease the negative bias supplied to the control grid of the gain control tube V304. As space current flow through the latter tube is thus increased, the bias potential present upon the conductor 300 is decreased to effect a corresponding increase in the gain through the first two stages of the amplifier 27. This has the effect of increasing the signal input to the rectifier tube V373 to produce a corresponding increase in the voltage across the condenser 364. The described gain increase in the amplifier 27 continues until the rectified signal voltage across the resistor 365 becomes appreciably higher than the voltage across the condenser 364 to produce charging current flow through this condenser. Specifically, when the gain increase is sufficient to effect recharging of the condenser 364 above its threshold value of 17 volts, space current flow through the tube V341 is restarted to stop space current flow through the tube V330 and thus terminate the increase in space current flow through the tube V304. In this regard it will be noted that the resistor 363 delays the voltage build up across the condenser 364. Hence, the gain increase is permitted to continue for an appreciable interval after the voltage across the resistor 365 exceeds 17 volts. Accordingly, the voltage across the condenser 364 may rise above 17 volts after the gain increase is arrested. In no case, however, can the voltage across the condenser rise above 21 volts since at that voltage level, the net bias on the grid of the tube V341 becomes zero, with the result that grid current flow through the tube is started when the 21 volt value is exceeded. When the increase in space current flow through the tube V304 is arrested, the gain increase in the amplifier stages 30 and 31 is stopped and the signal output level at the output side of the amplifier 27 is restored substantially to the desired normal value.

As will be evident from the above explanation and from a consideration of the curves shown in Fig. 3 of the drawings, the above described increase in the gain of the amplifier 27 is accomplished smoothly over a period of approximately two seconds, this period being determined in the manner explained above by the action of the tube V330 and the condenser 327 and resistor 331 included in the cathode circuit thereof. Hence, it is almost imperceptible to a program listener. From these curves it will also be noted that the described gain increase action in no way interferes with the operation of the gain decreasing components of the control unit 28 to suppress transient peaks in the level of the signal input pattern. Thus, the amplifier gain increases smoothly along the curve segment B3 until the desired level is reached, but is sharply reduced at the points A6 and A7 therealong corresponding to the peaks A6 and A7 in the signal input level I. Moreover, from inspection of the signal output level curve O it will be noted that this level is sub-normal for a short interval starting with the beginning of the third sentence but is smoothly and effectively increased to the desired normal level within a period of a few seconds. Due to the shortness of the sub-normal output level and the smoothness with which normal level is restored, the dip in volume is imperceptible to a program listener.

The increased gain through the amplifier 27 persists through the fourth sentence with peak suppression occurring at the points A8, A9 and A10 in the segment of the signal input level curve I representing this sentence. At the start of the fifth sentence originating with the first speaker having the higher voice output level, a gain reduction is required in the amplifier 27 in order to retain the desired constant signal output level. Specifically and due to the 6 db differential in the voice output levels of the two speakers, a gain reduction of this order of magnitude is required in the amplifier 27 to re-establish the desired normal signal output level. This gain reduction is effected at the first and second stages 30 and 31 of the amplifier through the action of the gain decreasing components of the control unit 28 in a manner which will be partially apparent from the above explanation. Specifically, with the overall gain of the amplifier 27 above normal, the tube V330 is rapidly disabled under the control of the disabler tube V341 at the start of the fifth sentence. Further, the combination of the above-normal gain in the amplifier 27 and increased level of the signal input to the amplifier causes the signal voltage half-cycles as rectified by the tube V315 to produce pulse current flow through the tube V320 which results in current flow through the control condenser 327 in the negative direction, thereby to effect a smooth increase in the bias voltage applied to the grid of the main control tube V304. This results in a reduction of the gain through the amplifier 27 in the manner previously explained which continues until the signal output level is reduced sufficiently to terminate pulse current flow through the tube V320. The gain decrease is accompanied by a reduction in the charging voltage for the condenser 364 due to the decreased level of signal output from the amplifier 27. Since, however, the gain decrease is terminated well before the voltage across the condenser 364 drops below 17 volts, no gain increase is initiated by the described gain reduction.

From the start of the fifth sentence on until the end of the seventh sentence, the gain control unit 28 continues to operate in the exact manner described above with no substantial overall change being produced in the gain through the amplifier 27. It will be noted, however, that during the fifth, sixth and seventh sentences peak suppression occurs in the exact manner explained above at each of the points A11 to A23, inclusive of the signal input level pattern I. It will be noted further that transitory gain increases occur at the points B5 and B6 during the initial increments of the on-signal periods of the sixth and seventh sentences.

*Adjustments during speech program*

In general, no adjustments are required during a newscast or similar speech program. After the program has started the operator may observe that the gain indicator meter 307, calibrated in db, is working too far away from the center region of its operating range. While no deterioration of the program quality is experienced so long as the meter 307 is not operating off scale, it is the better practice to so operate the equipment that the indicated reading of this meter is within the middle third of its operating range, in order that ample working range is available above and below the working point within which the above described controlling action of the gain control unit 28 may manifest itself to hold constant the signal output level from the amplifier 27.

If the meter 307 provides an indication close to the lower limit of its operating range, it indicates that the signal input level to the amplifier 27 is too high to entrust the gain control function entirely to the control unit 28. To correct this condition, the operator may adjust the mixer attenuator 13 to reduce the signal input level to the amplifier 27. As this adjustment is made, the indicating needle of the meter 307 gradually swings back to the middle portion of its range due to the gain increasing response of the control unit 28 which is produced when the signal input to the rectifier tube V373 is decreased. Specifically, as the signal input level to the amplifier 27 is reduced, gain increases are permitted throughout the succeeding on-signal periods until the signal level at the output side of the amplifier is restored to the proper value. The gain increase continues for a short interval after adjustment of the attenuator 13 is stopped, i. e. until a bias voltage of 17 volts is built up across the condenser 364, and manifests itself as an increase in space current flow through the tube V304 for reasons evident from the above explanation. Increased current flow through this tube results in the needle of the meter 307 swinging from its lower limit back toward the center of its operating range. By observing the meter 307, therefore, the operator can readily determine the degree of adjustment required to bring the gain control unit 28 back to the middle portion of its operating range. Preferably the adjustment should be made at a moderate rate of speed so that no sudden drop in signal output level is introduced in the signal transmission. By thus proceeding with the adjustment at a slow or moderate rate of speed, the gain control unit 28 is given ample time in which to increase the gain level within the variable gain amplifier 27 to compensate for the loss being introduced in the attenuator 13.

If desired, the operator can shift the operating range of the gain control unit up at the same time that he effects adjustment of the mixer attenuator 13 to decrease the signal input level to the amplifier 27. This is accomplished by pressing the gain up switch 335 to complete a path including the resistor 334 for charging in a positive direction the main control condenser 327 directly from the power supply unit 26. As the charge across this condenser is increased through the resistor 334, the bias voltage upon the control grid of the control tube V304 is decreased to effect an increase in space current flow through this tube which is accompanied by a decrease in the bias potential upon the conductor 300 and consequent increase in the gain effected within the first two stages of the amplifier 27. By observing the reading of the meter 307, the operator is informed as to when the gain up switch 335 should be released to terminate charging of the condenser 327. It will thus be apparent that by suitable adjustment of the mixer attenuator 13 or the gain up switch 235, or both, the gain control unit 28 may be maintained balanced at a point approximately midway along its operating range.

If on the other hand, reading of the gain indicator meter 307 shows that the gain control unit 28 is working too near the upper limit of its working range, the operator may correct this condition by adjusting the mixer attenuator 13 to increase the signal input level to the amplifier 27. This results in operation of the gain decreasing network 35 to decrease the gain in the amplifier 27 in a manner clearly apparent from the above explanation. The described gain change is accompanied by a decrease in space current flow through the tube V304 and consequent reorientation of the indicating needle of the meter 307 within the middle portion of the indicating range of this meter. Here again, adjustment of the mixer attenuator 13 should be effected at a relatively slow rate in order to prevent the gain control unit 28 from producing too abrupt a change in the gain of the amplifier 27.

From the foregoing explanation it will be apparent that by suitable adjustment of the mixer attenuator 13 with or without suitable actuation of the gain up switch 235, the operator may effectively control the gain control unit 28 so that it operates approximately at the middle of its working range. It has been found that with an amplifier 27 having a 30 db range of gain control, adjustment of the mixer attenuator 13 with or without operation of the gain up switch 235 is rarely needed. In the usual newscast, adjustments of this type are seldom ever required. In the foregoing explanation with reference to Fig. 3 of the drawings, it is assumed that the speech program is made up of two voices having approximately six db voice level differential. This assumption is made in order to demonstrate how the required rapid changes in the gain of the amplifier 27 are effected.

In the typical newcast program, however, only a single voice need be considered and usually the described rapid gain changes are not required. To decrease the rate of gain increase, the rate control switch 339 is shifted from its fast gain increase setting F to its medium increase setting M, thereby to connect the voltage dividing resistors 336 and 337 in series with the resistor 340 across the +B and −B bus conductors of the power supply unit 26. This operation has the effect of lowering the anode voltage of the gain increasing tube V330 and of decreasing the change in this anode voltage resulting from a given change in the magnitude of space current flow through either of the two disabler tubes V341 and V345. Specifically, when the resistors 336, 337 and 338 have the resistance values given below, a two-to-one ratio is provided between the rate of gain increase which occurs with the rate control switch in its fast increase setting F and its medium increase setting M. Moreover, with the switch 339 occupying its setting M, only half the change is produced in the anode voltage applied to the tube V330 in response to a given change in the signal output level from the amplifier 27 and hence the magnitude of gain increase is substantially reduced when the rate control switch is shifted to this setting. Further, with the rate control switch occupying its medium setting M, the gain through the amplifier 27 is not held at quite as high a value as when this switch occupies its fast increase setting, and hence peak suppression occurs less often for the reason that higher peaks are required to exceed the threshold value at which the gain decreasing network 35 starts to function. In the case of a single voice speech program, however, entirely adequate gain increase control is provided with the switch 339 in its medium increase setting M.

*Speech control with decreased peak compression*

As previously indicated, the rate of charging of the condenser 364 is in part determined by the resistance value of the resistor 363 connected in series therewith across the resistor 365, or in other words the amount of lag between signal level build up and the voltage build up across the condenser 364. Specifically, with the resistor 363 out of the circuit the lag between signal level rise and voltage build up across the condenser 364 is much less than when the condenser is charged through this resistor. In normal single voice speech programs, such, for example, as newscast, or sports announcing, it is desirable to obtain exceedingly rapid response of the gain increasing facilities to a rising signal. This may be accomplished by closing the switch 362 to short circuit the resistor 363 and thus bridge the condenser 364 directly across the charging resistor 365. With this switch closed, the voltage build up across the condenser 364 follows a voltage build up across the resistor 365 much more closely than with the resistor 363 included in the charging circuit. Accordingly, the condenser 364 is much more rapidly charged to the threshold voltage of 17 volts at which the gain increase is terminated in response to a decrease in the signal level at the output side of the amplifier 27. Moreover, with the resistor 363 in the circuit, the voltage across the resistor 365 must rise to a value equal to the sum of the 17 volt drop across the condenser 364 and the drop across the resistor 363 before a gain increase is stopped. This means that with the resistor 363 in the circuit, the signal output from the amplifier 27 rises to a higher level during a gain increase than would occur with this resistor short circuited. Since the amplifier output level is appreciably lower with the resistor 363 excluded from the circuit, peaks in the signal pattern must be of correspondingly greater amplitude in order to activate the gain decreasing network 35 in the manner explained above. Thus, by providing the short circuiting switch, the gain increasing section of the gain control unit may be rendered much more rapidly responsive to changes in the level of speech input to the amplifier 27 with an attendant decrease in the effectiveness of the network 35 to produce peak suppression.

*Music broadcasts*

It is current studio practice in broadcasting musical programs to conduct a balance and level check on a band before the band program is put on the air, regardless of the type of amplification control equipment available in the studio. During the balance and level check, monitoring facilities may be employed to check instrument placement with respect to the microphone and to determine the setting of the mixer attenuator 13 required to provide the proper signal input level to the amplifier 27 for mid-range operation of the gain control unit 28 during the opening passages of the program. For dance music broadcasts the gain increase rate control switch 339 should be set at the medium rate position M to limit or cut down the rate of gain increase effected in response to a given decrease in the signal level at the output side of the amplifier 27 in the manner explained above. Also, the switch 362 should preferably be left in its closed circuit setting such that the resistor 363 is excluded from the charging circuit for the condenser 364.

Assuming that the described adjustments have been made in the studio equipment, and that a typical dance music program is to be broadcast, the action which occurs in the system may best be explained by reference to the curves illustrated in Fig. 4 of the drawings wherein the curve I represents the level of signal input to the amplifier 27, the curve G indicates the departure from normal gain effected in this amplifier through operation of the gain control unit 28 responding to the signal input level changes and the curve O indicates the output signal level, i. e. the level of the signal voltage appearing across the conductors 238 and 239 at the output side of the amplifier 27. From an inspection of these curves, it will be noted that a slight gain increase occurs during the segment B1 of the time axis in response to the initial signal input to the amplifier 27, this gain increase occurring because of the time required to charge the condenser 364. As the program proceeds, a small gain reduction occurs during the time interval A1 when the first peak appears in the signal input pattern. Since this peak is relatively broad, very little gain recovery occurs following passage of the peak. The valley in the signal input level I occurring during the interval C1 is ineffective to produce any increase in the gain of the amplifier 27 for the reason that it is of relatively short duration and hence the condenser 364 does not have time to lose any appreciable portion of the charge accumulated thereon. A relatively large peak of relatively long duration occurs in the signal input level during the time interval A2. Accordingly, substantial gain reduction followed by only slight gain recovery is effected in the gain through the amplifier 27. Following this signal input peak, an additional peak A3 of high amplitude and short duration occurs in the signal input level I which results in a sharp decrease in the gain of the amplifier 27 followed by almost immediate and full gain recovery after the peak has passed. The low level region identified by the segment C2 of the time axis is of insufficient duration to permit appreciable discharging of the condenser 364 and hence does not result in any change in the gain in the amplifier 27.

Up to this point in the analysis of the curves shown in Fig. 4, the manner in which the gain changes are realized through response of the gain control unit 28 will be readily apparent from the above explanation with reference to the curves shown in Fig. 3 of the drawings illustrative of a typical two voice speech program. At the start of the time interval B2 along the time axis shown in Fig. 4, however, a sustained low level passage occurs in the pattern of the signal input curve I. This low level stretch may be occasioned by a single instrument, such, for example, as the piano taking the lead and is often as much as ten db lower than the full band level. When the signal level is thus caused to drop, the voltage across the charging resistor 365 is obviously decreased to a value lower than the voltage across the condenser 364. Accordingly, a portion of the charge accumulated on this condenser leaks off through the resistor 365 at a rate determined by the time constant of the circuit, thereby gradually to increase the bias potential negatively applied to the grid of the gain increase disabler tube V341. Specifically, the voltage across the condenser 364 gradually falls until it approaches 17 volts. When this occurs an increase in the gain through the variable gain stages 30 and 31 of the amplifier 27 is initiated in the manner explained above. By pulling up the gain in these two amplifier stages, the signal level at the output side of the amplifier 27 is obviously increased to effect a corresponding increase in the voltage across the condenser 364. The described action proceeds in the manner previously explained until a point is reached at which the increased space current flow through the tube V341 has the effect of cutting off charging current flow through the condenser 327 and the space current path of the tube V330.

In terms of the end result and again referring to Fig. 4 of the drawings, the action which occurs in the gain increasing channel is such that a gain increase of approximately 7 db, resulting in a corresponding increase in the signal output level is produced during the 20-second interval B2 during which the low level passage occurs. Stated otherwise, the gain through the amplifier 27 is increased to a value approximately 2 or 3 db lower than the upper threshold beyond which any increase in the signal input level will produce a corresponding gain reduction. This threshold may be set at any desired value by adjustment of the potentiometer tap along the resistor 374 to vary the proportion of the rectified signal voltage across this load resistor which is impressed between the input electrodes of the tube V360.

As indicated by the curve I, the sustained low level passage is followed by a full band passage of normal level. Immediately normal signal input level to the amplifier 27 is thus resumed, the gain decreasing unit 35 functions in the manner explained above rapidly to change the voltage across the condenser 327, thereby to produce a corresponding decrease in the gain through the variable gain stages 30 and 31 of the amplifier 27. Thus the gain level in this amplifier is rapidly pulled down and held down upon resumption of normal signal level input to the amplifier 27. Specifically, the increase in the level of signal input to the amplifier 27 offsets the decrease in gain in the amplifier to hold the signal level at the output side of the amplifier up and thus prevent a response of the gain increasing facilities.

After a period of normal level signal input to the amplifier 27 and specifically during the short off-signal or low signal level interval B3, the gain increase disabler tube V345 is rendered conductive. Specifically, the rectified signal voltage across the resistor 376 is insufficient to bias the tube V345 beyond cut off during this interval. When this tube draws current and the rectified voltage across the resistor 365 drops to zero or a low value, the condenser 364 is only partially discharged into the condenser 344 in the manner previously explained. Due to the charge retained in the condenser 364, an abnormal gain increase in the amplifier 27 is prevented when normal signal level input to this amplifier is restored at the end of the interval B3 to effect recharging of the condenser 364. The small gain increase which does occur following the B3 interval is indicated at B3 along the gain curve G.

*Delay restoring*

Thereafter and during the off-signal or low input level interval B4, the signal input level to the amplifier 27 again drops below the threshold value required to prevent space current flow through the tube V345. This drop in signal input level is followed by a low level passage B5 which endures for a matter of approximately 9 seconds. In the absence of the delay restoring facilities comprising the twin triode sections V350 and V353 and the circuit components associated with these triode sections, the described sequence in the signal input level would result in an excessive rise in the gain of the amplifier 27. Thus, while the signal input level during the interval B5 is sufficient to cut off space current flow through the tube V345, an inordinate rise in the gain of the amplifier 27 is required to build up a voltage across the condenser 364 sufficient ultimately to cut off space current flow through the tube V330. To prevent this abnormal gain rise from having the effect of destroying the volume contrast between the successive high and low level passages of the signal input pattern, the identified delay restoring facilities function artificially to deliver a charging current pulse to the condenser 364 a predetermined time interval after the start of the low level passage B5 which follows the drop in signal input level below the lower threshold value during the interval B4.

Specifically, when the tube V345 is rendered conductive at the start of the B4 interval, the voltage across the condenser 364 is reduced to a value below the 17 volt threshold value by discharging into the condenser 344 through the G4-cathode space path of the tube V345 in the manner explained above. Concurrently, current traverses the G2 grid-cathode space path of the tube V345 over a path which extends from the tap 126 through the condenser 352 and the described G2 grid-cathode space path of the tube V345 to the −B bus conductor 128, it being noted that the grid G2 of the tube V345 is normally maintained at a positive potential of approximately 20 volts relative to the cathode of this tube. Normally the grids of the triode sections V350 and V353 have no bias potentials thereon and hence draw heavy space currents producing large voltage drops across the two resistors 357 and 358. When, however, current flow through the condenser 352 is initiated in the manner just explained, a voltage is built up across this condenser and the resistor 351 which cuts off space current flow through the triode section V350. The grid of the triode section V353 now tries to go positive with respect to the cathode of this tube, but is prevented from so doing by grid current flow through the resistor 354. More particularly, when space current flow through the triode section V350 is cut off, the voltage drop across the resistor 357 is decreased to increase the positive potential at the upper terminal thereof. As a result, the condenser 356 is charged in a circuit which extends, positive to negative, from the +B bus conductor 120 by way of the resistor 357, the condenser 356 and the resistor 355 to the tap 126 in the power supply unit 26. The drop across the resistor 355 is obviously applied to the grid of the triode section V353 as a positive bias.

At the end of the time interval B4, space current flow through the tube V345 is cut off in the manner explained above to terminate charging current flow through the condenser 352. The accumulated charge on this condenser immediately starts to leak off through the shunt resistor 351 at a rate determined by the time constant of the R.-C. circuit comprised of the two identified elements. During this condenser discharge period, the gain of the amplifier stages 30 and 31 is allowed to increase under the control of the tube V341 in the exact manner explained above. Specifically, and as shown in Fig. 4 of the drawings, during this interval indicated at D, the gain of the amplifier 27 is increased approximately 6 db to produce a corresponding change in the output signal level. In the illustrated circuit wherein a condenser 352 of approximately .25 microfarad and a resistor 351 of approximately 5 megohms resistance are used, approximately 2½ seconds are required to discharge the condenser 352 sufficiently to restore space current flow through the triode section V350. When space current flow through this triode section is restarted to reestablish the voltage across the resistor 357, the anode potential thereof is substantially reduced, thus permitting the charge accumulated on the condenser 356 to discharge through the grid resistor 355. The voltage drop thus produced across the resistor 355 is negatively applied to the control grid of the triode section V353 and is sufficient to cut off space current flow through this triode section. As a consequence the voltage drop across the resistor 358 and normally occasioned by space current flow through the triode section V353 disappears to render the left electrode of the condenser 359 positive with respect to the right electrode thereof. When this occurs, charging current flows through the condenser 359 from positive to negative over a path which includes the resistors 358 and 361. The magnitude of such current flow is sufficient to build up a voltage across the resistor 361 in excess of that across the resistor 365. Moreover, this current flows in a direction to render the diode plates of the tube V360 positive with respect to the cathode of this tube. Thus, the voltage drop produced across the resistor 361 has the effect of developing current flow through the load resistor 365 in the proper direction to assist in charging the condenser 364. As the voltage across this condenser is thus artificially built up, space current flow through the tube V341 is increased to a point where space current flow through the tube V330 is cut off, thereby to terminate the gain increase action. Assuming that the condenser 359 has about one-fourth the capacitance value of the condenser 364, the charging current artificially delivered to the condenser 364 in the manner just explained is sufficient to charge this condenser from a condition of no charge to a voltage at which grid current starts to flow through the tube V341, this being the limiting condition insofar as voltage built up across the condenser 364 is concerned.

As will be evident from the above explanation, the interval during which charging current is artificially delivered to the condenser 364 is determined by the rate of charge of the condenser 359, which charge starts after the condenser 356 has discharged through the resistors 355 and 357 to permit a resumption of space current flow through the triode section V353. Specifically, the condenser 359 charges through the resistor 361 and the resistor 358. When this condenser is fully charged, no further action occurs in the delay restorer circuit until space current flow through the tube V345 is subsequently started and then stopped. In the illustrated circuit arrangement, the duration of the artificial charging pulse is on the order of $\frac{1}{10}$ second.

As will be evident from the above explanation, the described operation of the delay restoring facilities to deliver an artificial charging pulse to the condenser 364 occurs a predetermined time interval after signal output from the amplifier 27 above the lower threshold is restored following each no-signal period and each subnormal signal level period. Depending upon the circuit constants used in the R.-C. network comprising the elements 351 and 352, this time interval may be selected as desired. The specified two and one-half second interval has been found to be satisfactory from an operating standpoint. If any on-signal period endures for less than two and one-half seconds, delivery of the charging pulse to the condenser is prevented. Thus, if a signal period ends after two seconds, the tube V345 is rendered conductive to recharge the condenser 352 so that when the next on-signal period starts a full two and one-half second interval must be measured out before the charging pulse is delivered to the condenser 364. This means that if pauses are sufficiently frequent in a speech program, charging pulses are not artificially delivered to the condenser 364.

The primary purpose in providing the above-described delay interval is to prevent the action of the delay restoring facilities from interfering with the fast gain increase response desired in handling speech programs. Thus, with a normal speech program, the condenser 364 will be partially discharged during each off-signal period. Normally, these off-signal periods are spaced at intervals ranging from two to five seconds. Also normally, the condenser 364 will be recharged as a consequence of the signal voltage developed across the load resistor 374 before expiration of the two and one-half second time delay interval. Obviously, if the condenser 364 is sufficiently charged at the time the artificial charging pulse arrives two and one-half seconds after the start of an on-signal period, it will have no effect in altering the gain of the amplifier 27. More important, the two and one-half second delay interval is sufficient in handling speech programs to permit the desired signal increase to occur which may be required to maintain the signal output level approximately constant. This is in part due to the rapidity with which the off-signal periods occur during a normal speech program as contrasted with a music program in which signal breaks are comparatively infrequent. Specifically, the frequently occurring and transitory gain increases produced at the start of each on-signal period during a speech program permit the overall gain level of the amplifier 27 to be changed with sufficient rapidity to insure a practically constant signal output level from this amplifier for all practical purposes. At the same time, the delay restoring facilities comprising the triode sections V350 and V353 and their associated circuit components prevent unwanted gain increases under conditions of the character described above which occur with reasonable frequency in the handling of dance music programs.

Returning now to a consideration of the curves shown in Fig. 4 of the drawings, it will be noted that when the charging pulse is delivered to the condenser 364 at the expiration of the two and one-half second delay interval D, the gain of the amplifier 27 is held substantially constant for the succeeding interval E of the low level passage period B5. During the interval E, the condenser 364 discharges through the resistor 365 so that if the interval persistence is sufficiently long, the voltage drop across the condenser 364 is reduced sufficiently to permit a gain increase in the manner explained above.

At the expiration of the low passage period B4 normal signal input level to the amplifier 27 is resumed with a peak A5 occurring during the starting period thereof. This sudden and substantial increase in the signal input level has the effect of producing a substantial and immediate drop in the gain of the amplifier 27 under the control of the gain decreasing unit 35. When the gain has been reduced sufficiently to prevent an excessive signal output level, the gain holds substantially steady until a further change in the signal input pattern occurs.

During dance music program transmission, the operator attending the studio control board watches the gain indicator 307 and the level indicator 19, and if the input signal level to the amplifier 27 as indicated by the meter 307 changes sufficiently to cause the operation of the system to approach the end of the gain change range, it can be shifted back to mid-range in the exact manner explained above with reference to speech program transmission. Further, if a musical passage arrives where no gain increase is desired, such for example, as during a long tapering off interval at the end of a number, the operator can switch the gain increase rate control switch to its no-increase setting N to render the gain increase section of the control unit 28 inactive. By suitable manipulation of the gain down switch 333, the operator can also stop an unwanted gain increase. Closing of this switch has the effect of charging the condenser 327 through the resistor 332 in a negative direction to effect a corresponding decrease in space current flow through the tube V304 which results in a decrease in the gain of the amplifier 27. In this regard it is noted that the rate of gain increase may be visually observed by watching the meter 307 and is slow enough so that the operator has plenty of time to arrest the increase at any desired point by suitable manipulation of the gain down switch 333.

*Symphonic music*

In utilizing the described equipment during the transmission of a symphony orchestra program in which the signal pattern is characterized by frequent and lengthy low level passages, the gain increasing section of the control unit 28 is not used. Specifically, the gain increase rate control switch 339 is maintained in its no-increase setting N to hold the anode of the gain increasing tube V330 at a potential negative with respect to the cathode of this tube so that space current flow through the tube cannot occur. The gain decreasing unit 35, on the other hand, is allowed to function in the exact manner explained above to limit the maximum signal output level not to exceed a predetermined threshold value. During operation, each gain reduction effected by the gain decreasing unit 35 is, of course, followed by a recovery in amplifier gain determined by the duration of the peak responsible for the reduction.

To control the increases in gain which may be required in handling a symphonic program, manual manipulation of the gain up switch 335 to variably charge the condenser 327 is relied upon. More particularly, the mixer attenuator 13 should be adjusted to supply a high enough signal input level to cause some gain reduction during the music passages of maximum volume. In controlling the signal level in handling the signal pattern produced by a live symphony orchestra, there will occur many passages causing large gain reductions due to the wide dynamic range of the music. Following any such large gain reduction in the amplifier 27, the gain may be restored to a normal value by actuating the gain up switch 335 to close the previously described charging circuit for the condenser 327. When this circuit is closed, the gain is increased at a rate controlled by the time constant of the circuit comprising the two elements 327 and 334. Preferably the impedance values of these two circuit components are so chosen that the gain increases at a rate of about two db per second when the circuit is closed. Due to the action of the gain decreasing unit 35 to produce gain reduction when needed, it is practically never necessary to actuate the gain down switch 333 to effect discharging of the condenser 327 in handling a program of any type. However, the described facilities comprising the switch 333 and the discharge resistor 332 are provided for this purpose if needed.

One of the principal advantages of using the present improved gain control unit to effect gain control in the amplifier 27 in the transmission of symphonic music signals through this channel is that of providing smooth positive gain reduction which prevents signal peaks from exceeding a predetermined level at which over modulation of the signal carrier may occur. The type of reduction obtained is far superior to that afforded by a conventional limiter for the reason that the gain is not immediately restored to its original value after a peak passes.

*Summary of gain control action*

From the above explanation it will be understood that all automatic gain reductions are rapidly accomplished on a practically instantaneous basis through the action of the present improved gain decreasing unit 35 in its response to the signal level at the output side of the amplifier 27 and in its action to control the bias applied to the tube V304 of the gain control and indicator unit 34. The novel method of effecting gain reduction is such that the magnitude of gain recovery varies inversely as a function of the persistence of signal peaks. In addition to this automatic control of gain decrease, the described manually actuatable switch 333 and associated resistor 332 may be employed to effect gain reduction in the amplifier 27 on a controlled manual basis as desired.

It will also be understood that the function of the gain increasing section of the control unit 28 is that of maintaining the signal level at the output side of the amplifier 27 within predetermined upper and lower threshold limits. In general, this is accomplished by utilizing the two disabler stages 38 and 39 of the gain increasing section to control the interval of charging current flow in a positive sense through the condenser 327 of the gain increasing unit 37. Further, the rate and amount of gain increase resulting from a given change or decrease in the signal level at the output side of the amplifier 27 may be adjusted by suitable manipulation of the gain increase rate control switch 339. Specifically, this switch in combination with the associated voltage dividing network comprising the resistors 336, 337 and 338 may be actuated to change from a fast rate of gain increase normally employed in the handling of multiple speech broadcasts to a medium rate of gain increase usually used in the handling of single voice and dance music programs, or to completely disable the gain increasing section of the control unit 28. In the latter setting of the gain increase rate control switch 339, the described manual facilities including the gain up switch 335 and associated resistor 334 are employed to effect gain increase control of the amplifier 27.

Insofar as the automatic gain increasing action is concerned, it will further be understood that during each interval when the output signal level drops below the threshold value at which the tube V345 is rendered fully conductive, the gain increase rate control condenser 364 is partially discharged to insure a transitory gain increase at the start of the next on-signal period. Specifically, provision of the R.-C. network comprising the elements 351 and 352 insures a gain increase of limited magnitude at the start of each on-signal. The importance of this feature becomes readily apparent from a consideration of a program consisting of musical numbers interspersed with speech announcements. Thus if the condenser 364 were permitted to remain charged during an off-signal period of normal length, the tube V341 would remain conductive during the period and no gain increase could occur at the start of the succeeding on-signal period. Under these circumstances, if a period of low input signal level were to follow a period of high input signal level, i. e. a single voice announcement were to follow a full band passage, for example, the gain could not be increased until the accumulated charge on the condenser had leaked off through the resistor 365. This would require a period of five seconds or more during which time the signal output level would be sub-normal. In other words, the announcement could well be over before the output signal level could be pulled up to normal. On the other hand, if the condenser 364 were fully discharged during each off-signal period, an excessive gain increase would occur at the start of each on-signal period for reasons apparent from the preceding explanation. With the described circuit arrangement, however, wherein the condenser 364 is partially discharged at the beginning of each on signal period, the gain increasing facilities are immediately effective to increase the gain in limited steps when the signal input passage of low level starts.

It will also be apparent that the delay restorer facilities comprising the triode sections V350 and V353 serve the function of preventing unwanted gain increases during low level music signal passages which follow off-signal or low input level periods and that this action is accomplished without interfering with the fast gain increase response normally desired in the transmission of voice signal programs. Specifically, this is accomplished through operation of these facilities artificially to deliver a charging pulse through the condenser 364 a predetermined time interval following the start of each on-signal period.

Another important feature of the present invention is the described circuit arrangement for controlling the charging of the condenser 327 in opposite senses at rates which are constant with time, and for maintaining at a maximum only 5½ volts across this condenser under any and all operating conditions. Specifically, with no charge on this condenser, the gain control unit is in the middle of its operating range. If the condenser 327 is charged 5½ volts positive, i. e. to a voltage equaling that between the tap 123 and ground, minimum bias is applied to the control grid of the tube V304 and maximum gain is realized. On the other hand, if the condenser 327 is charged negatively to a voltage of 5½ volts minimum gain is realized. Thus within the operating limits of the gain control unit, the voltage across the condenser 327 never exceeds 5½ volts and so long as the unit is working within the middle third of its operating range is less than two volts. With such low voltage across this condenser, leakage of the charge accumulated thereon to effect an undesired gain change is almost completely prevented. Moreover, should leakage occur, the gain control unit will automatically drift toward the middle of its operating range.

While the circuit parameters and types of tubes used in the described system may be chosen to meet the requirements of any particular installation, the following circuit specifications have been found entirely satisfactory for use in typical installations.

| Circuit component | Description |
|---|---|
| Tube V107 | Type 83. |
| Inductance 108 | 30 Henry, 400 ohms. |
| Inductance 109 | 30 Henry, 400 ohms. |
| Condenser 110 | 8 mfd. |
| Condenser 111 | 16 mfd. |
| Condenser 112 | Do. |
| Resistor 113 | 1 megohm. |
| Condenser 114 | 0.1 mfd. |
| Condenser 116 | 16 mfd. |
| Condenser 117 | 20 mfd. |
| Resistor 118a | 10,000 ohms. |
| Resistor 118b | 10,000 ohms adjustable tap. |
| Resistor 119a | 500 ohms adjustable tap. |
| Resistor 119b | Do. |
| Resistor 119c | 500 ohm potentiometer. |
| Attenuator 200 | Variable T pad. 500 ohms input and output. |
| Resistor 202 | 500 ohms center tapped. |
| Resistor 203 | 500,000 ohms. |
| Condenser 203a | 0.1 mfd. |
| Tube V204 | Type 1612. |
| Tube V205 | Do. |
| Resistor 206 | 60,000 ohms. |
| Resistor 207 | 20,000 ohms center tapped. |
| Tube V209 | Type 1612. |
| Tube V210 | Do. |
| Resistor 211 | 60,000 ohms. |
| Resistor 212 | 25,000 ohms. |
| Resistor 213 | 5,000 ohms. |
| Resistor 214 | 25,000 ohms. |
| Condenser 215 | 0.01 mfd. |
| Resistor 216 | 75,000 ohms. |
| Condenser 217 | .01 mfd. |
| Resistor 218 | 2 megohms. |
| Resistor 219 | Do. |
| Tube V220 | type 6J7. |
| Resistor 221 | 2,000 ohms. |
| Resistor 222 | 2,000 ohms. |
| Tube V223 | type 6J7. |
| Resistor 224 | 1 megohm. |
| Condenser 225 | 0.03 mfd. |
| Resistor 226 | 40,000 ohms. |
| Resistor 227 | Do. |

| Circuit component | Description |
|---|---|
| Condenser 228 | 0.03 mfd. |
| Resistor 229 | 1 megohm. |
| Condenser 230 | 0.25 mfd. |
| Tube V231 | type 6J5. |
| Resistor 232 | 500,000 ohms. |
| Resistor 233 | 500 ohms. |
| Condenser 234 | 20 mfd. |
| Resistor 235 | 500,000 ohms. |
| Tube V236 | type 6J5. |
| Condenser 237 | 0.25 mfd. |
| Attenuator 241 | Variable T pad, 500 ohms input and output. |
| Resistor 302 | 100,000 ohms. |
| Resistor 303 | Do. |
| Tube V304 | type 6SL7. |
| Resistor 305 | 2,500 ohms. |
| Resistor 306 | 6,600 ohms. |
| Resistor 310 | 60,000 ohms. |
| Resistor 311 | Do. |
| Condenser 312 | 0.25 mfd. |
| Condenser 313 | Do. |
| Resistor 314 | 100,000 ohms center tapped. |
| Tube V315 | Type 6H6. |
| Resistor 316 | 1 megohm. |
| Tube V320 | Type 6J7. |
| Condenser 322 | 0.03 mfd. |
| Resistor 323 | 5,000 ohms. |
| Condenser 324 | 0.5 mfd. |
| Resistor 325 | 2 meghoms. |
| Condenser 327 | 1 mfd. |
| Tube V330 | Type 6J7. |
| Resistor 331 | 13 megohms. |
| Resistor 332 | 20 megohms. |
| Resistor 334 | 5 megohms. |
| Resistor 336 | 20 megohms. |
| Resistor 337 | Do. |
| Resistor 338 | 40 megohms. |
| Resistor 340 | 10 megohms. |
| Tube V341 | Type 6SL7. |
| Resistor 343 | 5 megohms. |
| Condenser 344 | 0.25 mfd. |
| Tube V345 | Type 6A8. |
| Tube V350 | Type 6SL7. |
| Resistor 351 | 5 megohms. |
| Condenser 352 | 0.25 mfd. |
| Tube V353 | Type 6SL7. |
| Resistor 354 | 1 megohm. |
| Resistor 355 | Do. |
| Condenser 356 | 0.25 mfd. |
| Resistor 357 | 500,000 ohms. |
| Resistor 358 | Do. |
| Condenser 359 | 0.25 mfd. |
| Tube V360 | Type 6Q7. |
| Resistor 361 | 500,000 ohms. |
| Resistor 363 | 5,000 to 250,000 ohms. |
| Condenser 364 | 1 mfd. |
| Resistor 365 | 40 megohms. |
| Condenser 370 | 0.05 mfd. |
| Condenser 371 | Do. |
| Resistor 372 | 1 megohm center tapped. |
| Tube V373 | Type 6H6. |
| Resistor 374 | 500,000 ohm potentiometer. |
| Condenser 375 | 0.06 mfd. |
| Resistor 376 | 2 megohms. |

While there has been described what is at present considered to be the preferred embodiment of the invention, it will be understood that various modifications may be made therein which are within the true spirit and scope of the invention as defined in the appended claims.

I claim:

1. In a signaling system, an audio frequency signal transmission channel including variable gain amplifying means, means coupled to said channel for converting audio frequency signals having amplitudes in excess of a predetermined value into current pulses occurring at a like audio rate, a plurality of serially related condensers connected to be charged by said current pulses, said condensers having unlike capacitance values, whereby the voltage distribution thereacross changes as a function of the persistence of said current pulses, means responsive to the voltage built up across said condensers for decreasing the gain of said amplifying means, and means providing a leakage current path for only a portion of said condensers, whereby the rate of gain recovery of said amplifying means following cessation of said current pulses is in part related to the change in voltage distribution across said condensers which occurs during charging thereof.

2. In a signaling system, an audio frequency signal transmission channel including variable gain amplifying means, means coupled to said channel for converting audio frequency signals having amplitudes in excess of a predetermined value into current pulses occurring at a related audio rate, a circuit including serially related resistance and capacitance means connected for traversal by said current pulses, whereby the ratio of the voltage components developed across said resistance means and said capacitance means decreases with increased persistence of said current pulses and said resistance means prevents suppression of the voltage developed across said circuit during initial current pulse transmission through said circuit, means responsive to the voltage build up across said circuit for decreasing the gain of said amplifying means, said resistance means providing for an immediate response of said last-named means to current pulses initially traversing said circuit, and means providing a leakage current path for at least a portion of said capacitance means, thereby to determine the rate of gain recovery of said amplifying means following cessation of said current pulses.

3. In a signaling system, an audio frequency signal transmission channel including variable gain amplifying means, means coupled to said channel for converting audio frequency signals having amplitudes in excess of a predetermined value into current pulses occurring at a related audio rate, a circuit traversed by said current pulses and serially including a resistor and a plurality of condensers, whereby during initial current pulse transmission through said circuit the major portion of the voltage across said circuit is developed across said resistor and successively greater portions of the voltage across said circuit are transferred to said condensers as said current pulses persist, means responsive to the voltage build up across said circuit for decreasing the gain of said amplifying means, said resistor providing for an immediate response of said last-named means to current pulses initially traversing said circuit, and means providing a leakage current path for only a portion of said condensers, whereby the rate of gain recovery of said amplifying means following cessation of said current pulses is in part related to the voltage distribution between said condensers.

4. In a signaling system, an audio frequency signal transmission channel including variable gain amplifying means, capacitance means adapted to have a residual charge thereon, means coupled to said channel for converting audio frequency signals having amplitudes in excess of a predetermined value into current pulses occurring at a related audio rate and for charging said capacitance means at a rate which is substantially independent of the residual charge on said capacitance means, and means responsive to the voltage thus developed across said capacitance means for decreasing the gain of said amplifying means.

5. In a signaling system, an audio frequency signal transmission channel including variable gain amplifying means, capacitance means adapted to have a residual charge thereon, means coupled to said channel for converting audio frequency signals having amplitudes in excess of a predetermined value into current pulses occurring at a related audio rate and for charging said capacitance means at a rate which is substantially independent of the residual charge on said capacitance means, means responsive to the voltage thus developed across said capacitance means for decreasing the gain of said amplifying means, and means providing a leakage current path across at least a portion of said capacitance means to determine the rate of gain recovery of said amplifying means following cessation of said current pulses.

6. In a signaling system, an audio frequency signal channel including variable gain amplifying means, a signal responsive gain control means for controlling said amplifying means to maintain the signal output level of said amplifying means within predetermined upper and lower limits during signal transmission through said channel, and means included in said gain control means for preventing any appreciable change in the gain setting of said amplifying means during off-signal periods.

7. In a signaling system, an audio frequency signal channel including variable gain amplifying means, signal responsive gain control means for controlling said amplifying means to maintain the signal output level of said amplifying means within predetermined upper and lower limits during signal transmission through said channel, means included in said gain control means for preventing any appreciable change in the gain setting of said amplifying means during off-signal periods, and means included in said gain control means for effecting a limited change in the gain of said amplifying means at the start of each on-signal period.

8. In a signaling system, an audio frequency signal channel including variable gain amplifying means, signal responsive gain control means for controlling said amplifying means to maintain the signal output level of said amplifying means within predetermined upper and lower limits during signal transmission through said channel, means included in said gain control means for preventing any appreciable change in the gain setting of said amplifying means during off-signal periods, and means included in said gain control means for effecting a limited increase in the gain of said amplifying means to increase the signal output level of said amplifying means toward said upper limit at the start of each on-signal period.

9. In a signaling system, an audio frequency signal channel including variable gain amplifying means, signal responsive gain control means for controlling said amplifying means to maintain the signal output level of said amplifying means within predetermined upper and lower limits during signal transmission through said channel, means included in said gain control means for preventing any appreciable change in the gain setting of said amplifying means during off-signal periods, and means for conditioning said gain control means during each off-signal period to produce a limited change in the gain of said amplifying means at the start of the next succeeding on-signal period.

10. In a signaling system, an audio frequency signal channel including variable gain amplifying means, signal responsive gain control means for controlling said amplifying means to maintain the signal output level of said amplifying means within predetermined upper and lower limits during signal transmission through said channel, means included in said gain control means for preventing any appreciable change in the gain setting of said amplifying means during off-signal periods, and means for conditioning said gain control means during each off-signal period to produce an increase in the gain of said amplifying means at the start of the next succeeding on-signal period.

11. In a signaling system, an audio frequency signal channel including variable gain amplifying means, means for changing the gain of said amplifying means in one sense, a condenser, means controlled by said condenser for arresting the change in gain effected by said last-named means when the voltage across said condenser exceeds a predetermined value, signal responsive means for at least partially discharging said condenser to a voltage less than said predetermined value during each off signal period, and signal responsive means for recharging said condenser to a voltage directly related to the magnitude of the signal level in said channel at the start of each on-signal period.

12. In a signaling system, an audio frequency signal channel adapted to be traversed by signals which may be of either of two different pattern types, means responsive to signals of one of said two pattern types traversing said channel for changing the gain of said amplifying means in one sense in response to a predetermined opposite sense change in the level of the signals traversing said channel, and means for preventing said last-named means from effecting the same gain change in said amplifying means when said predetermined signal level change of said one sense occurs in signals of the other pattern type traversing said channel.

13. In a signaling system, an audio frequency signal channel including variable gain amplifying means, means responsive to signals traversing said channel and having a predetermined signal break pattern for changing the gain of said amplifying means in one sense in response to an opposite sense change in the level of the signals traversing said channel, and means for preventing said last-named means from effecting the same gain change in said amplifying means when the signal level change of said one sense occurs in signals traversing said channel and having a different signal break pattern.

14. In a signaling system, an audio frequency signal channel adapted to be traversed by sustained and interrupted low level signal passages and including variable gain amplifying means, signal responsive means for increasing the gain of said amplifying means at the start of each low level passage, and means responsive to sustenance of a low level passage for more than a predetermined time interval for arresting the gain increase.

15. In a signaling system, an audio frequency signal channel adapted to be traversed by voice or music signals and including variable gain amplifying means, means responsive to voice signals traversing said channel for changing the gain of said amplifying means in one sense in response to an opposite sense change in the level of the voice signals traversing said channel, and means for preventing said last-named means from effecting the same gain change in said amplifying means when said predetermined signal level change of said one sense occurs in music signals traversing said channel.

16. In a circuit for determining signal level in a signal transmission channel, a condenser, means controlled by the voltage across said condenser for determining the signal level in said channel, means responsive to signal traversal of said channel for developing a charging voltage for said condenser which is of a magnitude directly related to the signal level in said channel, and additional signal controlled means for charging said condenser to a predetermined voltage not related to the signal level in said channel.

17. In a circuit for determining signal level in a signal transmission channel, a condenser, means controlled by the voltage across said condenser for determining the signal level in said channel, means for discharging said condenser at a controlled rate during each off-signal period, means responsive to signal traversal of said channel for developing a charging voltage for said condenser which is of a magnitude directly related to the signal level in said channel at the beginning of each on-signal period, and additional means for charging said condenser to a predetermined voltage not related to the signal level in said channel a predetermined time interval after the start of each on-signal period.

18. In a circuit for determining signal level in a signal transmission channel, a condenser, means controlled by the voltage across said condenser for determining the signal level in said channel, means for at least partially discharging said condenser during each off-signal period, means responsive to signal traversal of said channel for developing a charging voltage for said condenser which is of a magnitude directly related to the signal level in said channel at the beginning of each on-signal period, and means responsive to an off-signal period and the start of an on-signal period for charging said condenser to a predetermined voltage not related to the signal level in said channel a predetermined interval after the start of the on-signal period.

19. In a circuit for determining signal level in a signal transmission channel, a condenser, means controlled by the voltage across said condenser for increasing the signal level in said channel at a controlled rate until the voltage across said condenser equals or exceeds a predetermined voltage, means for preventing said last-named means from operating during an off-signal period, means for partially discharging said condenser to a voltage lower than said predetermined voltage during each off-signal period, and signal responsive means for developing a charging voltage for said condenser which is of a magnitude directly related to the signal level in said channel at the beginning of each on-signal period.

20. In a circuit for determining signal level in a signal transmission channel, a condenser, means controlled by the voltage across said condenser for increasing the signal level in said channel at a controlled rate until the voltage across said condenser equals or exceeds a predetermined voltage, means for preventing said last-named means from operating during an off-signal period, means for partially discharging said condenser at a controlled rate during each off-signal period, signal responsive means for developing a charging voltage for said condenser which is of a magnitude directly related to the signal level in said channel at the beginning of each on-signal period, and signal controlled means for charging said condenser at least to said predetermined voltage a predetermined time interval after the start of each on-signal period, thereby to limit the signal level increase which may be effected by said first-named means.

21. In a circuit for determining signal level in a signal transmission channel, electron discharge means including a pair of space current paths, means for changing at a controlled rate the signal transmission level in said channel until a predetermined magnitude of space current flow over said one path is attained, means controlled by space current flow over the other of said paths for rendering said last-named means non-responsive to the presence or absence of space current flow over said one path, means responsive to signals traversing said channel for cutting off space current flow over said other path during each on-signal period and for producing space current flow over said other path during each off-signal period, and signal responsive means for at least in part controlling space current flow over said one path during on-signal periods.

22. In a circuit for determining signal level in a signal transmission channel, a pair of electron discharge tubes each including a space current path, means for changing at a controlled rate the signal transmission level in said channel until a predetermined magnitude of space current flow through said one tube is attained, means controlled by space current flow through the other of said tubes for rendering said last-named means non-responsive to the presence or absence of space current flow through said one tube, means responsive to signals traversing said channel for cutting off space current flow through said other tube during each on-signal period and for producing space current flow through said other tube during each off-signal period, a condenser, means connecting said condenser to control space current flow through said one tube in accordance with the voltage across said condenser, means for partially discharging said condenser during each off-signal period, and means responsive to signal traversal of said channel for charging said condenser to a voltage directly related to the signal level in said channel.

23. In a circuit for determining signal level in a signal transmission channel, a pair of electron discharge tubes each including a space current path, means for changing at a controlled rate the signal transmission level in said channel until a predetermined magnitude of space current flow through said one tube is attained, means controlled by space current flow through the other of said tubes for rendering said last-named means non-responsive to the presence or absence of space current flow through said one tube, means responsive to signals traversing said channel for cutting off space current flow through said other tube during each on-signal period and for producing space current flow through said other tube during each off-signal period, a condenser, means connecting said condenser to control space current flow through said one tube in accordance with the voltage across said condenser, means for partially discharging said condenser during each off-signal period, means responsive to signal traversal of said channel for developing a charging voltage for said condenser which is of a magnitude directly related to the signal level in said channel, and additional means for charging said condenser to a predetermined voltage not related to the signal level in said channel a predetermined time interval after the start of an on-signal period.

24. In a circuit for determining signal level in a signal transmission channel, a pair of electron discharge tubes each including a space current path, means for changing at a controlled rate the signal transmission level in said channel until a predetermined magnitude of space current flow through said one tube is attained, means controlled by space current flow through the other of said tubes for rendering said last-named means non-responsive to the presence or absence of space current flow through said one tube, means responsive to signals traversing said channel for cutting off space current flow through said other tube during each on-signal period and for producing space current flow through said other tube during each off-signal period, a condenser, means connecting said condenser to control current flow through said one tube in accordance with the voltage across said condenser, means for partially discharging said condenser during each off-signal period, means responsive to signal traversal of said channel for developing a charging voltage for said condenser which is of a magnitude directly related to the signal level in said channel, and signal responsive means for charging said condenser to a voltage at which said predetermined space current flow through said one tube is exceeded a predetermined time interval after the start of an on-signal period.

25. In a circuit for determining signal level in a signal transmission channel, a pair of electron discharge tubes each including a space current path, means for changing at a controlled rate the signal transmission level in said channel until a predetermined magnitude of space current flow through said one tube is attained, means controlled by space current flow through the other of said tubes for rendering said last-named means non-responsive to the presence or absence of space current flow through said one tube, means responsive to signals traversing said channel for cutting off space current flow through said other tube during each on-signal period and for producing space current flow through said other tube during each off-signal period, a condenser, means connecting said condenser to control space current flow through said one tube in accordance with the voltage across said condenser, means serially including a shunt resistance-capacitance network and at least a portion of the space current path of said other tube for partially discharging said condenser during each off-signal period, and means responsive to signal traversal of said channel for charging said condenser to a voltage directly related to the signal level in said channel.

26. In a circuit for determining signal level in a signal transmission channel, a pair of electron discharge tubes each including a space current path, means for changing at a controlled rate the signal transmission level in said channel until a predetermined magnitude of space current flow through said one tube is attained, means controlled by space current flow through the other of said tubes for rendering said last-named means non-responsive to the presence or absence of current flow through said one tube, means responsive to signals traversing said channel for cutting off space current flow through said other tube during each on-signal period and for producing space current flow through said other tube during each off-signal period, a condenser, means connecting said condenser to control space current flow through said one tube in accordance with the voltage across said condenser, means serially including a shunt resistance-capacitance network and at least a portion of the space current path of said other tube for partially discharging said condenser during each off-signal period, means responsive to signal traversal of said channel for developing a charging voltage for said condenser which is of a magnitude directly related to the signal level in said channel at the start of each on-signal period, and means for charging said condenser to a voltage at which said predetermined space current flow through said one tube is exceeded a predetermined time interval after the start of each on-signal period.

27. In a circuit for controlling signal level in a signal transmission channel, an electron discharge tube provided with an anode and cathode having a space current path therebetween, a condenser for determining signal level in said channel in accordance with the voltage thereacross and for determining the cathode potential of said tube, a current source, a voltage dropping resistor, means for variably charging said condenser from said source through said resistor and over said path, means normally producing current flow through said resistor which maintains said anode at a negative or a low positive potential with respect to said cathode, and signal responsive means for decreasing the current flow through said resistor, thereby to render said anode increasingly positive relative to said cathode and thus effect charging current flow over said path.

28. In a circuit for controlling signal level in a signal transmission channel, an electron discharge tube provided with an anode and cathode having a space current path therebetween, a condenser for determining signal level in said channel in accordance with the voltage thereacross and for determining the cathode potential of said tube, a current source, a voltage dropping resistor, means for variably charging said condenser from said source through said resistor and over said path, means normally producing current flow through said resistor which maintains said anode at a potential either negative or only slightly positive with respect to said cathode, signal responsive means for decreasing the current flow through said resistor, thereby to render said anode increasingly positive relative to said cathode and thus effect charging current flow over said path, and manually adjustable means for determining the magnitude of charging current flow over said path resulting from the production of a given change in current flow through said resistor as effected by said signal responsive means.

29. In a circuit for controlling signal level in a signal transmission channel, an electron discharge tube provided with an anode and cathode having a space current path therebetween, a condenser for determining signal level in said channel in accordance with the voltage thereacross and for determining the cathode potential of said tube, a current source, a resistor, means for variably charging said condenser from said source through said resistor and over said path, means normally producing current flow through said resistor which maintains said anode at a potential either negative or only slightly positive with respect to said cathode, signal responsive means for decreasing the current flow through said resistor, thereby to render said anode increasingly positive with respect to said cathode and thus effect charging current flow over said path, and means including a manually adjustable voltage dividing network connected between said resistor and said anode for determining the magnitude of charging current flow over said path resulting from the production of a given change in current flow through said resistor as effected by said signal responsive means.

30. In a signaling system, an audio frequency signal transmission channel including variable gain amplifying means, capacitance means adapted to have a residual charge thereon, means coupled to said channel and responsive to a change in the signal level in said channel in one sense for charging said capacitance means at a substantially constant rate which is substantially independent of the residual charge on said capacitance means, and means responsive to the charging of said capacitance means for producing an opposite sense change in the gain of said amplifying means.

31. In a signaling system, an audio frequency signal transmission channel including variable gain amplifying means, capacitance means adapted to have a residual charge thereon, means coupled to said channel and responsive to a decrease in the signal level in said channel for charging said capacitance means in one sense, means coupled to said channel and responsive to an increase in the signal level in said channel for charging said capacitance means in an opposite sense at a substantially constant rate which is substantially independent of the residual charge on said capacitance means, and means responsive to said charging of said capacitance means in different senses for controlling the gain of said amplifying means to maintain substantially constant the signal level at the output side thereof.

32. In a circuit for controlling signal level in a signal transmission channel, an electron discharge tube provided with an anode and cathode having a space current path therebetween, a condenser for determining signal level in said channel in accordance with the voltage thereacross, a current source, a biasing resistor, signal controlled means for charging said condenser from said source through said resistor and over said path, and means for controlling the charging current flow through said tube and said condenser in accordance with the voltage developed across said resistor, thereby to render the rate of charging of said condenser substantially constant.

33. In a circuit for controlling signal level in a signal transmission channel, an electron discharge tube provided with an anode and cathode having a space current path therebetween and including a control grid, a condenser for determining signal level in said channel in accordance with the voltage thereacross, a current source, signal controlled means for charging said condenser from said source over said path, a resistor serially included in said path and connected between said cathode and said condenser, and means for impressing at least a portion of the voltage developed across said resistor between said cathode and control grid in the correct sense to maintain the magnitude of current flow through said resistor substantially constant, thereby to render the rate of charging of said condenser substantially constant.

34. In a signaling system, an audio frequency signal transmission channel including variable gain amplifying means, gain increasing means coupled to said channel and responsive to a decrease in the level of the signal traversing said channel for increasing the gain of said amplifying means, and means for preventing said gain increasing means from effecting any substantial change in the gain setting of said amplifying means during an off-signal period.

35. In a signaling system adapted to be traversed by speech and music signals, an audio frequency signal transmission channel including variable gain amplifying means, gain increasing means responsive to a decrease in the amplitude of speech signals traversing said channel for increasing the gain of said amplifying means at a predetermined rate, and means for decreasing the rate at which the gain of said amplifying means is increased by said gain increasing means when music signals of decreasing amplitude traverse said channel.

36. In a circuit for controlling the signal level in a variable gain audio frequency signal transmission channel, signal responsive gain changing means for varying the gain of the controlled channel inversely with changes in the signal level in said channel, gain change delay means for delaying the response of said gain changing means to signal level changes in said channel, and means operative during each off-signal period to remove the gain change delay provided by said gain change delay means.

37. In a circuit for controlling the signal level in a variable gain audio frequency signal transmission channel, signal responsive gain changing means for varying the gain of the controlled channel inversely with changes in the signal level in said channel, and gain change delay and delay removal and restoring apparatus including circuit elements physically independent of those of said signal responsive gain changing means and comprising means for delaying the response of said gain changing means to signal level changes in said channel, means operative during each off-signal period to remove the gain change delay provided by said gain change delay means, and means for restoring the gain change delay provided by said gain change delay means during each on-signal period.

38. In a circuit for controlling the signal level in a variable gain audio frequency signal transmission channel, signal responsive gain changing means for varying the gain of the controlled channel inversely with changes in the signal level in said channel, and gain change delay and delay removal and restoring apparatus including circuit elements physically independent of those of said signal responsive gain changing means and comprising means for delaying the response of said gain changing means to signal level changes in said channel, means operative during each off-signal period to remove the gain change delay provided by said gain change delay means, and means for restoring the gain change delay provided by said gain change delay means a predetermined interval after the start of each on-signal period.

39. In a circuit for controlling the signal level in a variable gain audio frequency signal transmission channel, signal responsive gain changing means for varying the gain of the controlled channel inversely with changes in the signal level in said channel, and gain change delay and delay removal and restoring apparatus including circuit elements physically independent of those of said signal responsive gain changing means and comprising means for delaying the response of said gain changing means to signal level changes in said channel, means responsive to termination of each on-signal period for removing the gain change delay provided by said gain change delay means, and means responsive to the start of each on-signal period for restoring the gain change delay provided by said gain change delay means a predetermined interval after the start of the on-signal period.

40. In a circuit for controlling the signal level in a variable gain audio frequency signal transmission channel, signal responsive gain increasing means for increasing the gain of the controlled channel in response to decreasing signal level in said channel, gain increase delay means for delaying the response of said gain increasing means to signal level decreases in said channel, and means operative to remove the gain increase delay provided by said gain increase delay means during each off-signal period.

41. In a circuit for controlling the signal level in a variable gain audio frequency signal transmission channel, signal responsive gain increasing means for increasing the gain of the controlled channel in response to decreasing signal level in said channel, and gain increase delay and delay removal and restoring apparatus including circuit elements physically independent of those of said signal responsive gain changing means and comprising means for delaying the response of said gain increasing means to signal level decreases in said channel, means operative to remove the gain increase delay provided by said gain increase delay means during each off-signal period, and means for restorting the gain increases delay provided by said gain increase delay means during each on-signal period.

42. In a circuit for controlling the signal level in a variable gain audio frequency signal transmission channel, signal responsive gain increasing means for increasing the gain of the controlled channel in response to decreasing signal level in said channel, and gain increase delay and delay removal and restoring apparatus including circuit elements physically independent of those of said signal responsive gain changing means and comprising means for delaying the response of said gain increasing means to signal level decreases in said channel, means responsive to termination of each on-signal period for removing the gain increase delay provided by said gain increase delay means, and means responsive to the start of each on-signal period for restoring the gain increase delay provided by said gain increase delay means a predetermined interval after the start of the on-signal period.

43. In a circuit for controlling the signal level in a variable gain audio frequency transmission channel, gain changing means for varying the gain of the controlled channel inversely with changes in the signal level in said channel, and signal pattern discriminating means for governing said gain changing means to provide for gain changes of one character in said channel when certain signal level changes occur in signals of one pattern traversing said channel and to provide for gain changes of a different character in said channel when said certain signal level changes occur in signals of a different pattern traversing said channel.

44. In a circuit for controlling the signal level in a variable gain audio frequency transmission channel, gain increasing means for increasing the gain of the controlled channel in response to decreasing signal level in said channel, and signal pattern discriminating means for governing said gain changing means to provide for gain increases of one character in said channel in response to the occurence of a certain decrease in the level of signals of one pattern traversing said channel and to provide for gain increases of a different character in said channel when said certain decrease in signal level occurs in signals of a different pattern traversing said channel.

45. In a circuit for controlling the signal level in a variable gain audio frequency transmission channel, gain increasing means for increasing the gain of the controlled channel in response to decreasing signal level in said channel, and signal pattern discriminating means for governing said gain changing means to provide for a relatively fast gain increase in said channel in response to the appearance of voice signals of a certain level in said channel and to provide for a delayed gain increase in said channel in response to the appearance of music signals of said certain level in said channel.

46. In a circuit for controlling the signal level in a signal transmission channel, a rectifier, a condenser for determining signal level in said channel in accordance with the voltage thereacross, a current source, a voltage dropping resistor, means for variably charging said condenser from said source through said resistor and said rectifier, means producing current flow through said resistor which normally maintains the polarity of the voltage across said rectifier such that said rectifier is substantially non-conductive, and signal responsive means for decreasing the current flow through said resistor, thereby to reverse the polarity of the voltage across said rectifier and thus effect charging current flow over said path.

LEON H. APPLEMAN.

REFERENCES CITED

The following references are of record in the file of this patent:

UNITED STATES PATENTS

| Number | Name | Date |
|---|---|---|
| 2,156,846 | Getaz | May 2, 1939 |
| 2,228,071 | Bjornson | Jan. 7, 1941 |
| 2,233,487 | Robertson | Mar. 4, 1941 |
| 2,244,695 | Hathaway | June 10, 1941 |
| 2,247,468 | Barr et al. | July 1, 1941 |
| 2,250,559 | Weber | July 29, 1941 |
| 2,281,693 | Holst et al. | May 5, 1942 |
| 2,285,794 | Barney | June 9, 1942 |
| 2,390,856 | Thompson | Dec. 11, 1945 |
| 2,392,384 | Howard | Jan. 8, 1946 |
| 2,424,216 | Atkins | July 22, 1947 |